(12) United States Patent
Furuya et al.

(10) Patent No.: US 7,177,424 B1
(45) Date of Patent: *Feb. 13, 2007

(54) CRYPTOGRAPHIC APPARATUS AND METHOD

(75) Inventors: Soichi Furuya, Kanagawa (JP); Michael Roe, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,790

(22) Filed: May 17, 2000

(30) Foreign Application Priority Data

Jun. 22, 1999 (EP) ................................. 99304886

(51) Int. Cl.
*H04L 9/00* (2006.01)
(52) U.S. Cl. .................. 380/37; 380/259; 380/268; 380/28; 380/42
(58) Field of Classification Search ................. 380/28, 380/37, 42, 259, 268
See application file for complete search history.

(56) References Cited

U.S. PATENT DOCUMENTS

| | | | | |
|---|---|---|---|---|
| 4,316,055 A * | 2/1982 | Feistel | ......................... | 380/37 |
| 5,091,942 A * | 2/1992 | Dent | ......................... | 380/46 |
| 5,148,485 A * | 9/1992 | Dent | ......................... | 380/46 |
| 5,268,962 A * | 12/1993 | Abadi et al. | ................. | 713/161 |
| 5,297,207 A * | 3/1994 | Degele | ......................... | 380/46 |
| 5,369,705 A * | 11/1994 | Bird et al. | ................... | 713/163 |
| 5,420,928 A * | 5/1995 | Aiello et al. | .................. | 380/46 |
| 5,734,721 A * | 3/1998 | Clark | ......................... | 380/46 |
| 6,014,445 A * | 1/2000 | Kohda et al. | ................. | 380/28 |
| 6,058,187 A * | 5/2000 | Chen | ......................... | 713/170 |
| 6,072,873 A * | 6/2000 | Bewick | ...................... | 380/217 |
| 6,415,032 B1 * | 7/2002 | Doland | ....................... | 380/255 |
| 6,549,622 B1 * | 4/2003 | Matthews, Jr. | ............... | 380/29 |
| 6,601,175 B1 * | 7/2003 | Arnold et al. | .............. | 713/202 |
| 6,701,434 B1 * | 3/2004 | Rohatgi | ....................... | 713/168 |
| 6,804,354 B1 * | 10/2004 | Driscoll | ....................... | 380/28 |
| 6,961,427 B1 * | 11/2005 | Qiu et al. | ..................... | 380/44 |
| 2001/0021253 A1 * | 9/2001 | Furuya et al. | .............. | 380/259 |

(Continued)

FOREIGN PATENT DOCUMENTS

EP        0 443 752 A       8/1991

(Continued)

OTHER PUBLICATIONS

Schneier, Bruce. Applied Cryptography, Second Edition. John Wiley and Sons Inc. Oct. 18, 1995.*

(Continued)

*Primary Examiner*—Taghi T. Arani
(74) *Attorney, Agent, or Firm*—Mattingly, Stanger, Malur & Brundidge, P.C.

(57) ABSTRACT

An encryption system comprises a pseudo-random number generator (KS) for generating a long pseudo-random sequence (S) from a shorter encryption key (K) and, if necessary, a nonce value (N), and a mixing function (MX) for combining the sequence with a plaintext message (P) on a block-by-block basis, where successive blocks (S(i)) of 128 bits of the sequence are combined with successive 64-bit blocks of plaintext (P(i)) to produce successive 64-bit blocks of ciphertext. The blockwise use of a long pseudo-random sequence preserves the advantages of a block cipher in terms of data confidentiality and data integrity, as well as benefiting from the speed advantages of a stream cipher.

29 Claims, 22 Drawing Sheets

U.S. PATENT DOCUMENTS

2001/0021254 A1* 9/2001 Furuya et al. .............. 380/259
2004/0252836 A1* 12/2004 Yoshida et al. ............. 380/268

FOREIGN PATENT DOCUMENTS

EP         0 751 646 A    1/1997
JP         09-160490      6/1997

OTHER PUBLICATIONS

Winternitz, Robert S. Crypto '82: A Workshop on the Theory and Application of Cryptographic Techniques; Security of a Keystream Cipher with Secret Initial Value. University of California. Aug. 23-25, 1982.*

"Applied Cryptography", Second Edition, Chapter 9, Bruce Schneier, pp. 189-211.

"Efficient, Parallelizable Methods for Data Encryption" IBM Technical.

Disclosure Bulletin, US, IBM Corp., New York, vol. 38, No. 3, pp. 75-77.

"Ein Schweizer Schluessel Mit Weltweiter Zukunft?", T. Brueggermann.

Protector, CH, Graf Und Neuhaus, Zurich, vol. 21, No. 6, pp. 51-52, 55, 57, 59.

"Cryptographic Device", IBM Technical Disclosure Bulletin, vol. 16, No. 10, .

Mar. 1974 (Mar. 1974), pp. 3406-3409.

*Cryptography Theory and Practice*, Douglas R. Stinson, CRC Press, 1995.

* cited by examiner

CRYPTOGRAPHIC APPARATUS AND METHOD

TECHNICAL FIELD OF THE INVENTION

The present invention relates to an encryption apparatus and method, and to a corresponding decryption apparatus and method, particularly but not exclusively for use in telecommunication systems and over computer networks, for example to provide secure channels for Internet commerce.

BACKGROUND OF THE INVENTION

Modern cryptography relies on the use of cryptographic algorithms, also known as ciphers, to encrypt data for secure transmission over networks such as the Internet. In addition to the primary function of preserving data confidentiality, cryptographic systems can serve a number of other functions, including preserving data integrity. This requires that the receiver of a message should be able to verify that the message has not been changed by a third party after encryption.

To avoid the need to keep cryptographic algorithms secret, which can be difficult when the algorithm is incorporated into commercially available products, present day algorithms use an encryption key K which can assume any one of a large number of possible values. The security of the encryption system then resides in the key, rather than in the details of the algorithm.

There are two general types of key-based algorithm, known as symmetric, or private-key, algorithms and asymmetric, or public-key algorithms. The present invention is concerned with symmetric algorithms. In most symmetric algorithm based encryption schemes, the encryption and decryption keys are the same and the sender and receiver must agree on a key before they can communicate securely. They must also ensure that the key remains secret, since the security of the system is compromised by a third party knowing the key.

FIG. 1 illustrates the basic principle of encrypted communication. Unencrypted data, known as plaintext P, is encrypted by the Sender using an encryption algorithm E and an encryption key K to produce encrypted data, known as ciphertext C. Mathematically, the operation can be written as $E_K(P)=C$. The ciphertext is sent over a communication channel to a Receiver, where a decryption algorithm D is applied to recover the plaintext from the ciphertext. This operation can be written as $D_K(C)=P$. The functions D and E have the property that $D_K(E_K(P))=P$, and D is referred to herein as the inverse of E. In the event that different, but cryptographically related, keys $K_1$, $K_2$ are used for encryption and decryption respectively, then the appropriate representations are $E_{k1}(P)=C$, $D_{K2}(C)=P$ and $D_{K2}(E_{k1}(P))=P$.

Symmetric algorithms can be divided into two categories, generally referred to as block ciphers and stream ciphers. In general terms, stream ciphers operate on plaintext a single bit at a time and are considerably faster than block ciphers. For example, in a simple stream cipher, each bit of plaintext is exclusive or'd (XORed) with a respective bit from a pseudo-random stream of bits generated by a keystream generator.

Although a stream cipher provides the primary cryptographic function of preserving the confidentiality of a message, the preservation of data integrity requires an additional independent mechanism, since otherwise changes at one bit position in the plaintext result in changes at the corresponding position in the ciphertext. Therefore, additional circuits and/or memory may be required to implement an independent integrity preserving mechanism.

Block ciphers operate on groups of plaintext bits known as blocks. For example, a typical block size is 64 bits. Block ciphers are used because they are capable of providing both confidentiality and data integrity. However, they are in general considerably slower than stream ciphers. For example, the known DES block cipher encrypts data in 64-bit blocks, using a 56-bit key. This is used to generate a key schedule comprising 16 different 48-bit subsets of the key. All the outputs of the key schedule are used for the encryption of every plaintext block in a highly non-linear data randomising algorithm.

Reference is directed to Bruce Schneier, "Applied Cryptography", Second Edition, Chapter 9, pp. 189–211, for an overview of block and stream ciphers and their modes of operation.

SUMMARY OF THE INVENTION

The present invention aims to combine the advantages of block and stream ciphers.

In accordance with the present invention, there is provided encryption apparatus for performing symmetric encryption, comprising means for generating a keystream block in response to an encryption key, the keystream block comprising a plurality of bits of a pseudo-random number sequence, and means for combining the keystream block with a plaintext block comprising a plurality of bits to produce a ciphertext block, wherein the number of bits in the keystream block exceeds the number of bits in the plaintext block.

The blockwise use of a pseudo-random sequence generated from a shorter key sequence can preserve the advantages of a block cipher in terms of data confidentiality and data integrity, as well as enabling the apparatus to benefit from the speed advantages of a stream cipher, since generation of a pseudo-random number sequence is generally faster than operation of a block cipher and can allow simpler and therefore faster implementation of the combining means.

The generating means can comprise means for selecting successive keystream blocks from said pseudo-random number sequence, each to be combined with a respective plaintext block from plaintext data to be encrypted. Further, the combining means can be configured to use each of the successive keystream blocks once only during the encryption of given plaintext data under a given key, which can provide unconditional, one-time-pad-like, security if the pseudo-random number generator is assumed to be secure. Differently stated, the generating means is capable of generating fresh keystream blocks to encrypt every plaintext block, with the length of the keystream bit sequence being dependent on the length of the data to be encrypted. The freshness of the keystream data enables the combining means to be simpler and faster than the corresponding data randomisation means in a block cipher, since the combining means is not required to be a non-linear function.

The apparatus can include means for splitting a keystream block into sub-blocks, which can include distinct or overlapping portions of the pseudo-random bit sequence.

The combining means can comprise first means for combining a first portion of the keystream block with the plaintext block to produce a first combination, and second means for combining the result of said first combination with a second part of the keystream block to produce the ciphertext block. By splitting an s-bit keystream block into b-bit sub-blocks, which may involve the addition of padding bits, the combining means can combine equal length sequences of plaintext and keystream sub-blocks, for example by mathematical operations in GF($2^b$).

The generating means can comprise a pseudo-random number generator having an encryption key as an input, or a hash function receiving a key and nonce as inputs.

The encryption apparatus can comprise a plurality of keystream generators for generating intermediate keys and means for switching between said keystream generators in dependence on the plaintext block to be encrypted, so allowing for increases in speed by parallel computation of intermediate key sequences.

The encryption apparatus can alternatively comprise a second keystream generator for generating a second intermediate key in response to the first intermediate key generated by the first keystream generator with a nonce input. By creating nonces based on individual elements such as files and records, the first intermediate key provides individual element encryption, which provides for encryption of individual elements in applications such as database and disk encryption, and permits the secret key to be maintained at the encryption site, with sharing of the intermediate key only.

According to the invention, there is further provided encryption apparatus comprising a keystream generator for generating a pseudo-random number sequence in response to an encryption key and processing circuitry configured to combine a keystream block comprising a bit pattern selected from the pseudo-random number sequence with a plaintext block comprising a bit sequence, said keystream block bit pattern comprising a greater number of bits than the plaintext block bit sequence.

In accordance with the invention, there is also provided decryption apparatus for performing symmetric decryption, comprising means for generating a keystream block in response to a decryption key, the keystream block comprising a plurality of bits of a pseudo-random number sequence, and means for combining the keystream block with a ciphertext block comprising a plurality of bits to recover a plaintext block, wherein the number of bits in the keystream block exceeds the number of bits in the ciphertext block.

The invention further provides a method of performing symmetric encryption comprising generating a keystream block in response to an encryption key, the keystream block comprising a plurality of bits of a pseudo-random number sequence, and combining the keystream block with a plaintext block comprising a plurality of bits to produce a ciphertext block, wherein the number of bits in the keystream block exceeds the number of bits in the plaintext block.

The invention further provides a method of decrypting a symmetrically encrypted ciphertext message comprising generating a keystream block in response to a decryption key, the keystream block comprising a plurality of bits of a pseudo-random number sequence, and combining the keystream block with a ciphertext block comprising a plurality of bits to produce a plaintext block, wherein the number of bits in the keystream block exceeds the number of bits in the ciphertext block.

In accordance with the invention, there is further provided a computer program for performing symmetric encryption comprising means for generating a keystream block in response to an encryption key, the keystream block comprising a plurality of bits of a pseudo-random number sequence, and means for combining the keystream block with a plaintext block comprising a plurality of bits to produce a ciphertext block, wherein the number of bits in the keystream block exceeds the number of bits in the plaintext block.

There is also provided, in accordance with the invention, a computer program for decrypting a symmetrically encrypted ciphertext message comprising means for generating a keystream block in response to a decryption key, the keystream block comprising a plurality of bits of a pseudo-random number sequence, and means for combining the keystream block with a ciphertext block comprising a plurality of bits to produce a plaintext block, wherein the number of bits in the keystream block exceeds the number of bits in the ciphertext block.

BRIEF DESCRIPTION OF THE DRAWINGS

Embodiments of the invention will now be described by way of example with reference to the accompanying drawings, in which.

DETAILED DESCRIPTION

Figure 1:
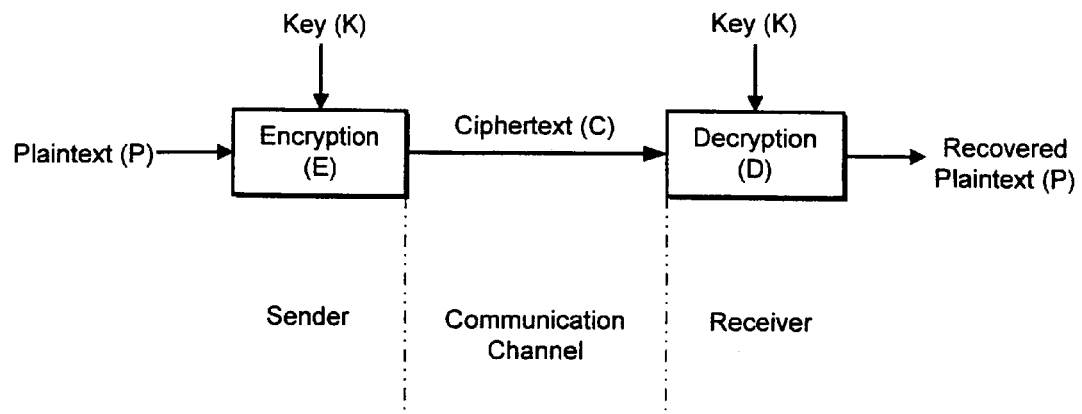
FIG. 1 is a schematic block diagram showing the known structure of a symmetric cryptographic system.
Figure 2:
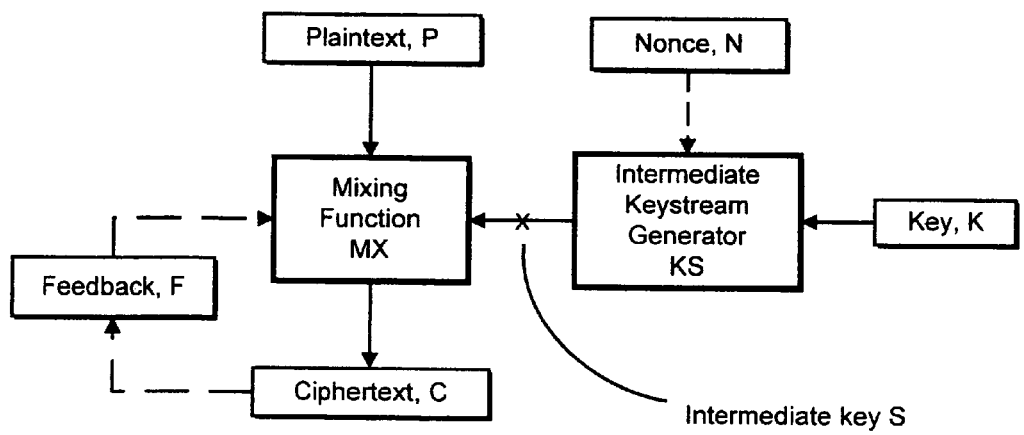
FIG. 2 is a schematic block diagram showing the basic structure of the encryption apparatus in accordance with the invention.

Referring to FIG. 2, the encryption apparatus according to the invention comprises an intermediate keystream generator KS and a mixing function MX.

Keystream Generator KS

KS is designed to generate an intermediate key, in the form of a pseudo-random number sequence S, in response to an encryption key K. KS is, for example, a known cryptographic pseudo-random number generator or an ideal cryptographic hash function or any device which is guaranteed to generate the same unpredictable sequence whenever the same input is given. For example, KS is a pseudo-random number generator used for known stream ciphers, such as WAKE, SEAL or RC4. KS can also be a block cipher in counter mode or a hash function with a counter. While a pseudo-random number generator can generate a very long plaintext sequence, for example 64 kB with the SEAL algorithm, a hash function generates a relatively short sequence, for example 160 bits. However, by using different successive inputs to the hash function, as described in detail below, the hash function operates as pseudo-random number generator to generate a long pseudo-random sequence.

As shown in FIG. 2, KS can also receive a nonce N, defined as a sequence of data in which, for a particular key, there is a negligible probability that a particular value will appear twice. For example, a nonce can be derived from a counter which always counts up during the encryption of a single message under a particular key. Therefore, each of the nonce values used during the encryption of the message is unique. Further examples of nonces are given below.

Figure 3:
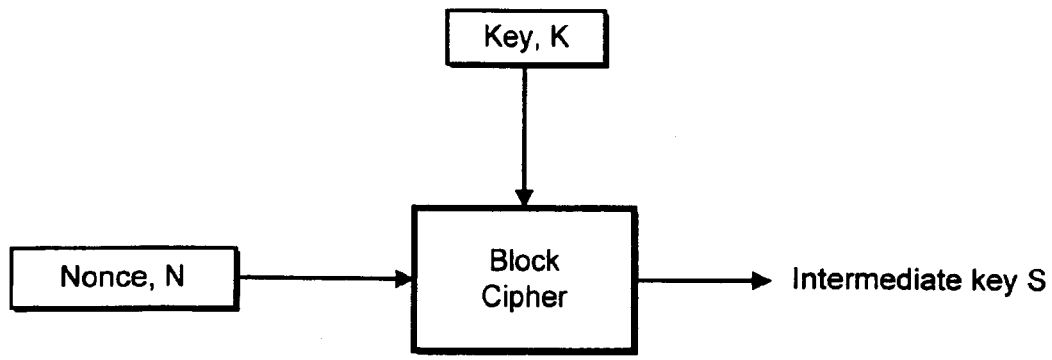
FIG. 3 is a schematic block diagram showing one implementation of the keystream generator KS shown in FIG. 2.
Figure 4:
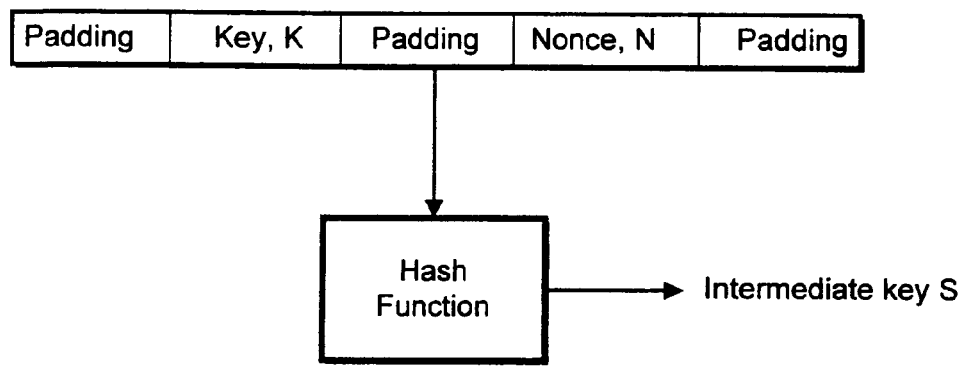
FIG. 4 is a schematic block diagram showing a further implementation of the keystream generator KS shown in FIG. 2.

As a further example of an implementation of KS, referring to FIG. 3, a nonce N is encrypted using a known block cipher under a key K to produce ciphertext S which comprises a pseudo-random number string. Alternatively, referring to FIG. 4, a concatenation of the key K, a nonce N and padding bits is used as an input to a hash function to generate a hash value to be used as the intermediate key S. In both of the above cases, another nonce, for example the previous nonce value incremented by one, is used to generate the next pseudo-random number string, once the current string has been used for encryption.

Mixing Function MX

Referring again to FIG. 2, the intermediate key S is an input to the mixing function MX which receives a plaintext message P and combines it with the pseudo-random number sequence S to generate the ciphertext C. The mixing function MX can also receive a feedback input F, dependent on previous ciphertext output.

Figure 5:
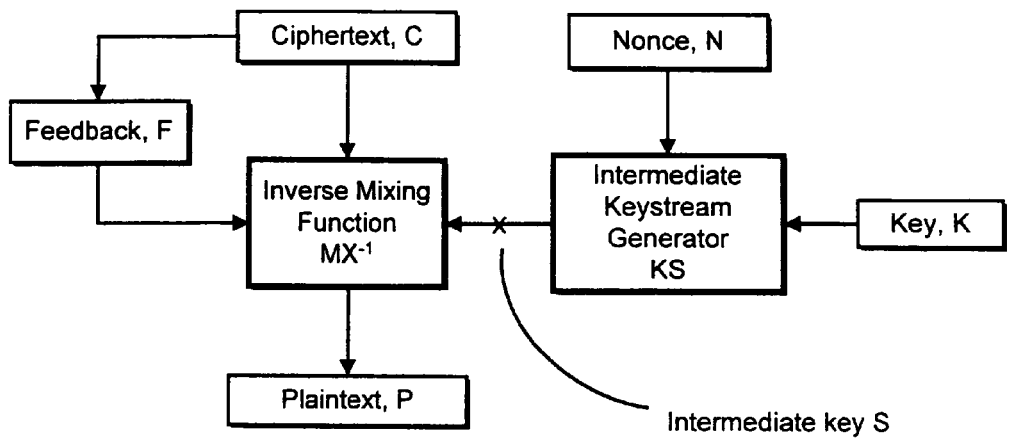
FIG. 5 is a schematic block diagram showing a basic structure of decryption apparatus according to the invention.

Referring to FIG. 5, the mixing function MX is a reversible function, so that decryption is achieved by applying the ciphertext C and the pseudo-random sequence S to the inverse mixing function $MX^{-1}$ to restore the plaintext P.

The mixing function MX can be designed to preserve data confidentiality and data integrity in accordance with the following criteria:

Confidentiality—the ciphertext of a plaintext can be all possible strings with substantially uniform distribution under any key.

Integrity—the ciphertext of a modified plaintext is substantially uniformly distributed amongst all possible ciphertext strings under any key, so that an attacker who does not know S cannot predict how the plaintext differs after any modification of the ciphertext.

These conditions can be represented mathematically as follows:

Confidentiality—Prob$_y$(MX(P,S)=C)<$e_c$, for any P and C
Integrity—Prob$_y$(MX(P,S)^MX(P',S)=D)<$e_i$, for any (P,P', D)

where Prob$_y$(X) represents the probability of X over the uniform distribution of Y, the operator '^' represents bitwise exclusive—or (XOR) and where $e_c$ and $e_i$ are sufficiently small that it is computationally infeasible for an attacker to exploit these probabilities to crack the encryption scheme.

Figure 6:
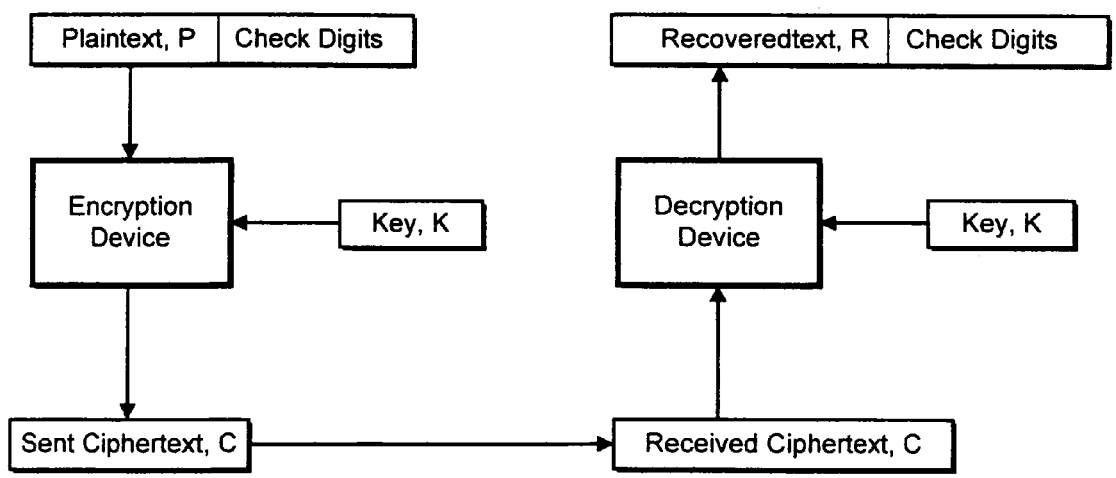
FIG. 6 is a block diagram illustrating a message format for verifying data integrity.

Referring to FIG. 6, verification of data integrity can be performed by attaching known redundant data to a plaintext message and confirming that, after encryption and corresponding decryption, the known data is recovered.

Figure 7:
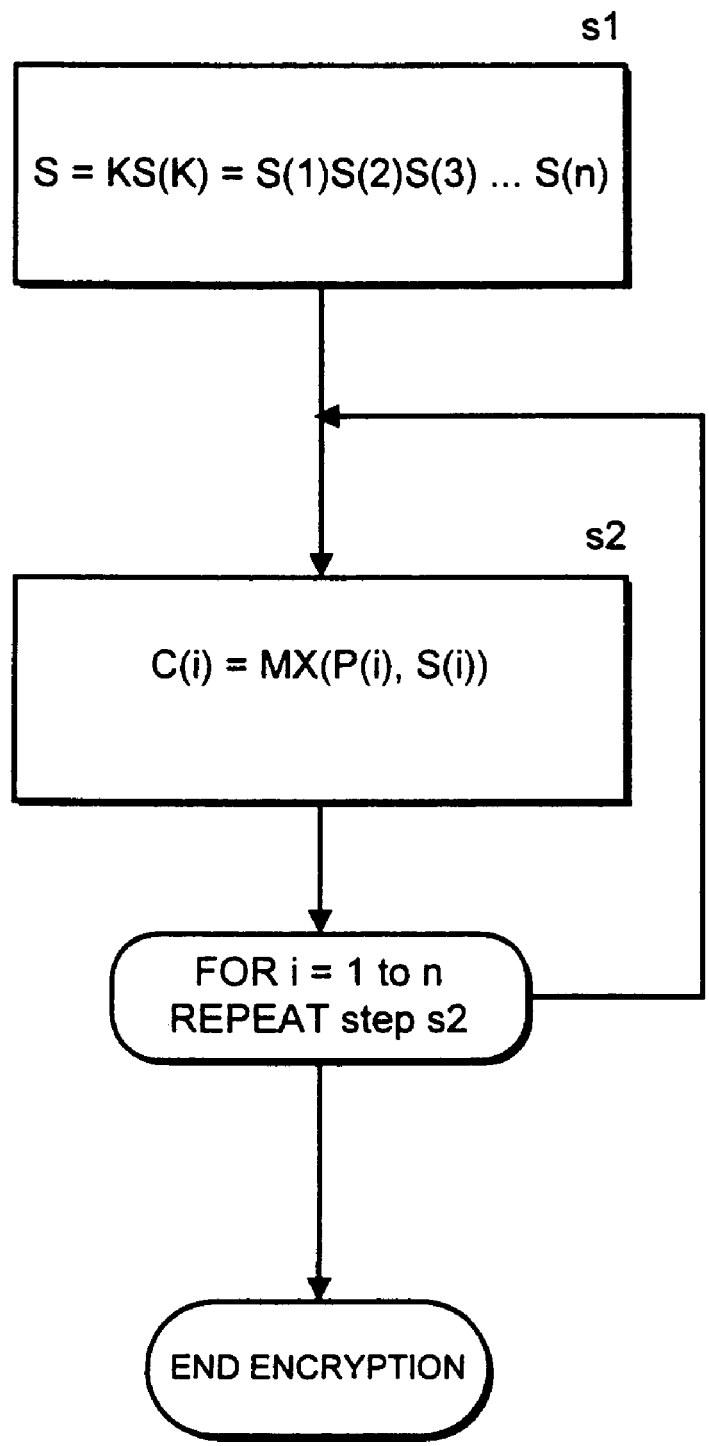
FIG. 7 is a flow diagram explaining the operation of the encryption apparatus of FIG. 2.

FIG. 7 is a flow diagram explaining the operation of the apparatus of FIG. 2, without nonce or feedback inputs, by reference to a generalised block P(i), of length b bits, which represents the $i^{th}$ block of the plaintext message P. C(i) represents the corresponding block of ciphertext, of length b bits. S(i) represents the $i^{th}$ block of the pseudo random number sequence S, of length s bits.

Figure 8:
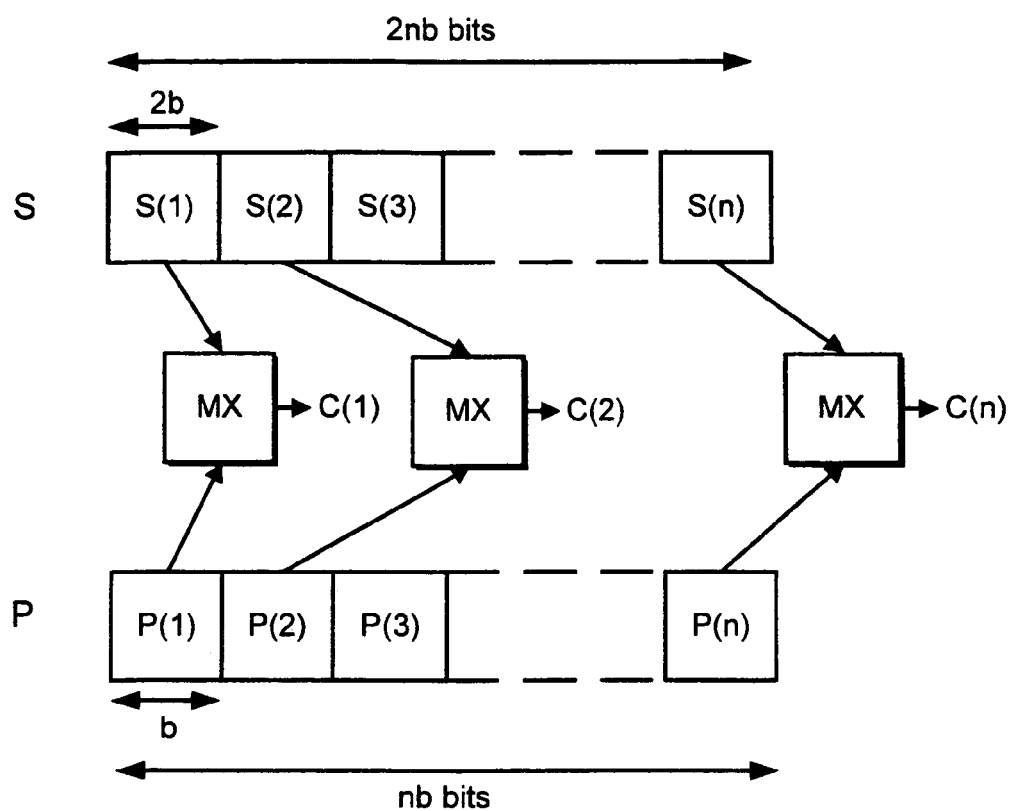
FIG. 8 illustrates the generation of blocks of ciphertext in accordance with the invention.

At step s1, KS generates the pseudo-random number sequence S corresponding to the key K, where the total length of the sequence S is generally greater than the length of the key K (k bits). At step s2, the $i^{th}$ block of S is combined with the $i^{th}$ block of the plaintext P by the mixing algorithm MX to produce the $i^{th}$ block of ciphertext C. This step is repeated for all n blocks of P. For example, referring to FIGS. 7 and 8 and assuming the total length of the plaintext data is 6400 bits, and that b=64, k=64 and s=2b=128, then n=100 and i takes the values 1 to 100. The sequence S must then be at least 12800 bits long. Step s2 is repeated for each value of i, with the first step being the combination of P(1), ie. the first 64 bits of P, with S(1), ie. the first 128 bits of S, to produce C(1) ie. the first 64 bit block of ciphertext C.

By using an s-bit intermediate key which is longer than a b-bit plaintext message, information theory explains that perfect data confidentiality can be achieved. In terms of data integrity, there are, on average, $2^{s-b}$ key candidates for each plaintext/ciphertext pair, so that even if a cryptanalyst knows both the plaintext and the ciphertext, he cannot predict how the plaintext will change for any amendment to the ciphertext, assuming that the probability of doing so, $1/2^{s-b}$, is negligible. For example, where s=2b and b=64 bits, then the number of key candidates is $2^{64}$.

Figure 9:
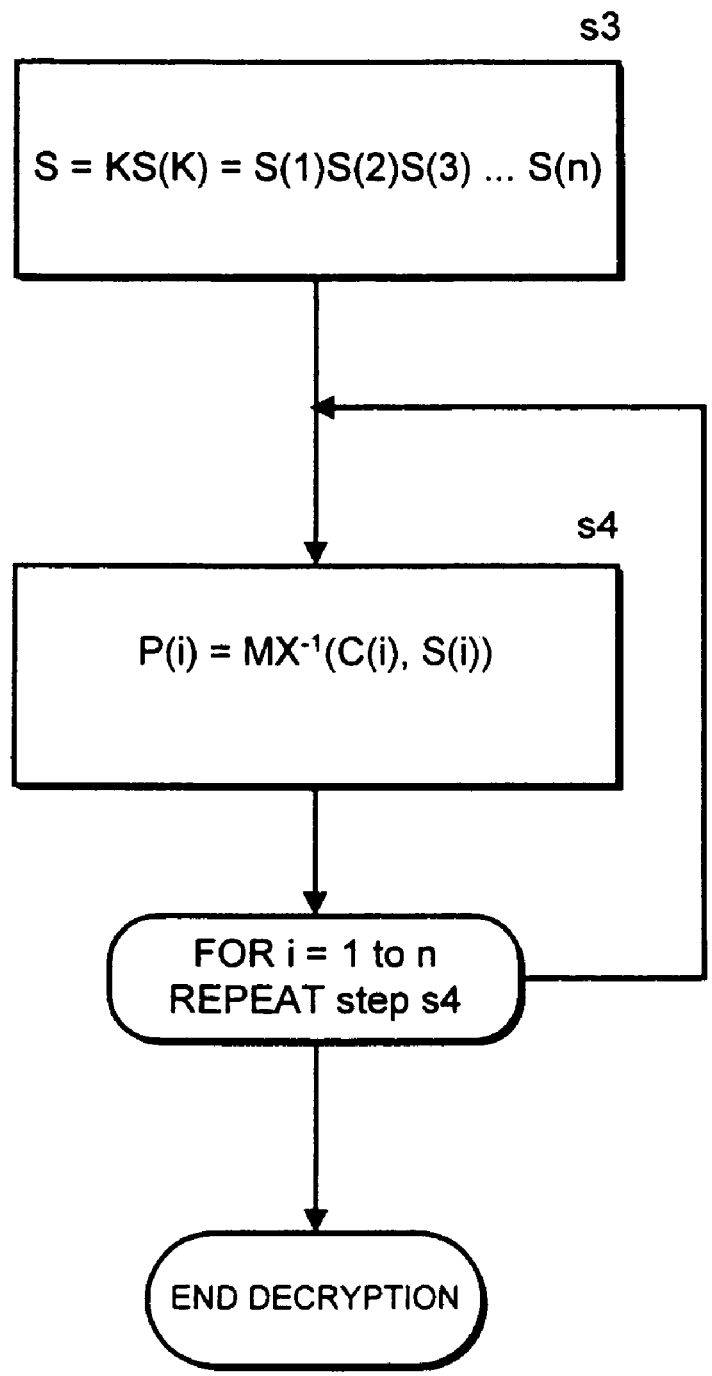
FIG. 9 is a flow diagram explaining the operation of the decryption apparatus of FIG. 5.

FIG. 9 is a flow diagram explaining the operation of the decryption apparatus of FIG. 5, and is analogous to the flow diagram of FIG. 7.

At step s3, KS generates the pseudo-random number sequence S corresponding to the key K, of length k bits. At step s4, the $i^{th}$ block of S is combined with the $i^{th}$ block of the ciphertext C by the inverse mixing algorithm $MX^{-1}$ to produce the $i^{th}$ block of plaintext P. This step is repeated for all n blocks of C to recover the original plaintext.

Figure 10:
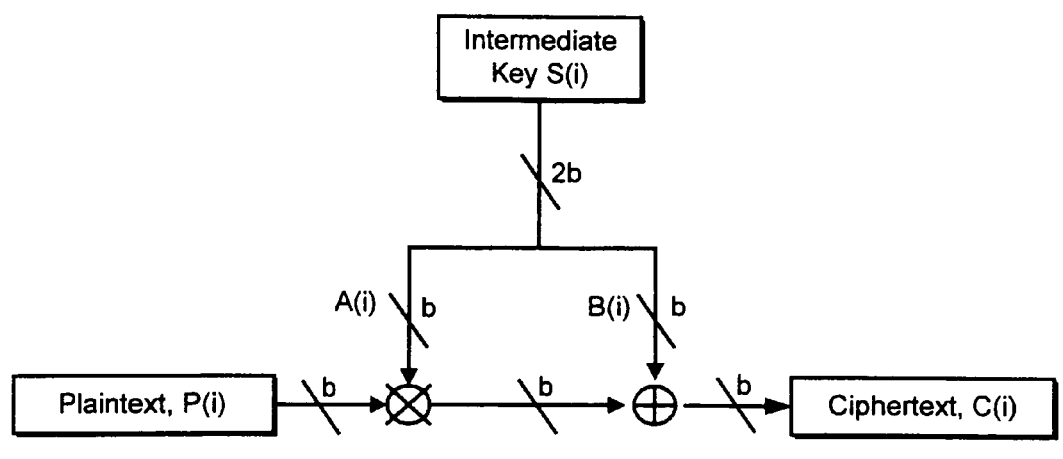
FIG. 10 is a schematic block diagram showing an example of a mixing function MX.

Referring to FIG. 10, one example of an MX function comprises two operator functions, each of which operate on separate parts of the pseudo-random input block S(i). For example, a block of plaintext P(i) comprises b bits. S(i) is a 2b bit block. The first b bits of S(i) are denoted A(i) and the final b bits are denoted B(i), so that S(i) can also be represented as a concatenation of A(i) and B(i), i.e. A(i)‖B(i). A(i) is combined with the b-bit block P(i) by multiplication in $GF(2^b)$ and the result is combined with B(i) by addition in $GF(2^b)$, where multiplication and addition in $GF(2^b)$ refers to computation in a Galois Field. Such computation can readily be implemented in hardware with linear-feedback shift registers. Reference is directed to Bruce Schneier, "Applied Cryptography", Second Edition, pages 254 to 255 for further details of Galois Field computation.

For multiplication and division in $GF(2^b)$ a modification needs to be applied to each pseudo-random sequence block whose value is 0, to ensure that the function is reversible. The problem can be illustrated with the case of integer multiplication, where if a*c=b, then b/c=a except for c=0. However, by modifying the multiplier c to avoid zero values, this problem can be overcome.

The necessary modification can be carried out in a number of known ways. For example, the block A(i) is tested. If it is 0, it is reset to some known number, for example 1. Alternatively, the entire block is discarded and the next block chosen. This procedure can be carried out at the key sequence generator KS. For example, if a key sequence block S(i) is to be split into a plurality of sub-blocks T(i) . . . Z(i) and it is known that each sub-block is to be processed at the mixing function MX using multiplication/division in $GF(2^b)$, then each sub-block is checked and if its value is 0, is reset to be 1. Alternatively, if any of the sub-blocks T(i) . . . Z(i) have a value of 0, the entire block S(i) is discarded and the next block selected from the pseudo-random number sequence from the pseudo-random number generator.

The MX function shown in FIG. 10 can also be represented as:

$$C(i)=MX(P(i), S(i))=(A(i)*P(i))^{\wedge}B(i)$$

where $$S(i)=A(i)\|B(i);$$

Figure 11:
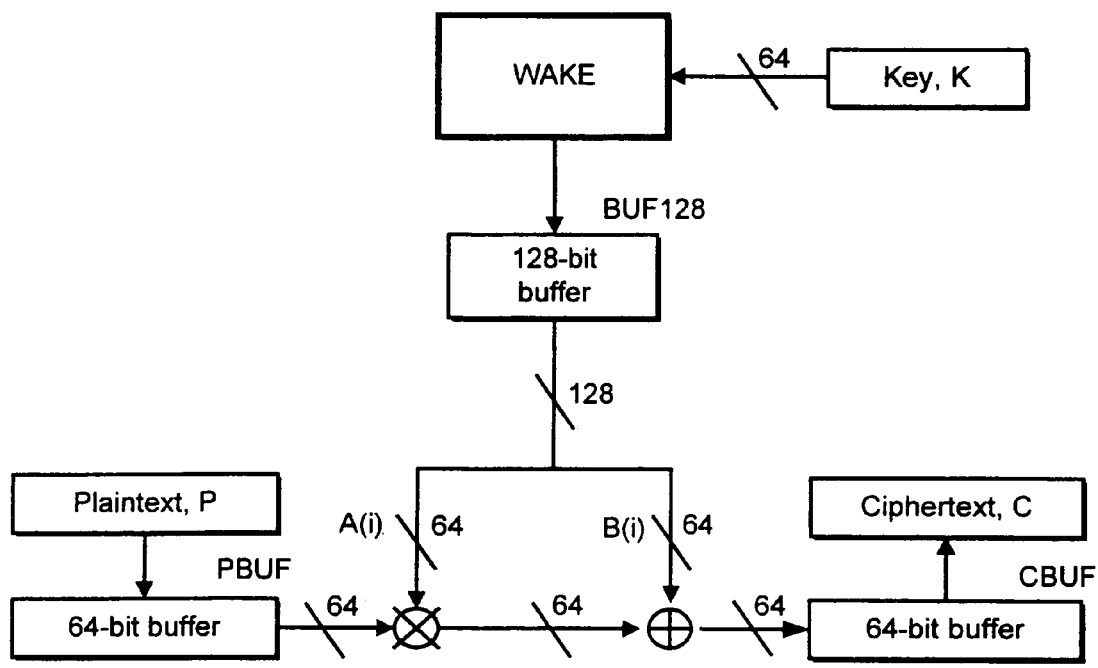
FIG. 11 is a block diagram showing a more detailed implementation of the mixing function MX shown in FIG. 10.

X^Y represents addition in $GF(2^b)$, equivalent to bitwise exclusive—or (XOR); and X*Y represents multiplication in $GF(2^b)$;

Referring to FIG. 11, a more detailed implementation of the encryption function of FIG. 10 is shown. A 64-bit key K is used as an input to the pseudo-random number generator used for the WAKE stream cipher, which produces a stream of 32-bit words. Four such words are stored in a 128-bit buffer BUF128 to provide the keystream block S(i). The 128-bit block S(i) is split into two 64-bit blocks A(i) and B(i). Plaintext P is stored 64 bits at a time in a 64-bit plaintext buffer PBUF. The MX function relies on multiplication and addition in $GF(2^{64})$ as explained with reference to FIG. 10.

The resulting ciphertext block C(i) is stored 64 bits at a time in a 64-bit ciphertext buffer CBUF and the whole ciphertext is generated by concatenation of the resulting ciphertext blocks, i.e. C(1)‖C(2)‖C(3) . . . ‖C(n), where n is the total number of plaintext blocks. Reference is directed to Bruce Schneier, "Applied Cryptography", Second Edition, pages 400 to 402 for a more detailed description of, and references to, the WAKE algorithm.

Another example of a mixing function suitable for use in the encryption devices of FIGS. 10 and 11 and using the terminology set out above can be represented as:

$$MX(P(i), S(i))=A(i)^{\wedge}(P(i)*B(i))$$

The block length b can be varied dynamically, as long as both encryption and decryption devices have access to the necessary common information, in particular the block length and the definition of the irreducible polynomial for $GF(2^b)$. However, memory consumption and performance constraints may limit the use of this technique for large sized blocks, for example in excess of 1 MB.

The keystream block S(i) need not be split into distinct sub-blocks, but can also be split into sub-blocks containing overlapping bit sequences. For example, a 128-bit keystream block S(i) is split into 16 sub-blocks of 48 bits each. Each sub-block can then be used as an input to one round of the DES algorithm to encrypt a plaintext block. Reference is directed to Bruce Schneier, "Applied Cryptography", Second Edition, pages 270–278 for a description of the DES algorithm.

Examples of the mixing function MX with a feedback input are shown in FIGS. 12 to 15, using the terminology set out above. As described above, each block S(i) of the pseudo-random sequence S is divided into two b-bit blocks so that S(i)=A(i)‖B(i), where A(i) and B(i) are each b bits long. Each block of ciphertext C(i) is a combination of a plaintext block S(i) and the previous ciphertext block C(i–1), represented as C(i)=MX(P(i), S(i), C(i–1)). In all cases, C(0) is an initial vector IV supplied to prevent encryption attacks based on messages having identical beginnings, for example, a standard e-mail address. IV can be random data or, for example, a time stamp.

Figure 12:
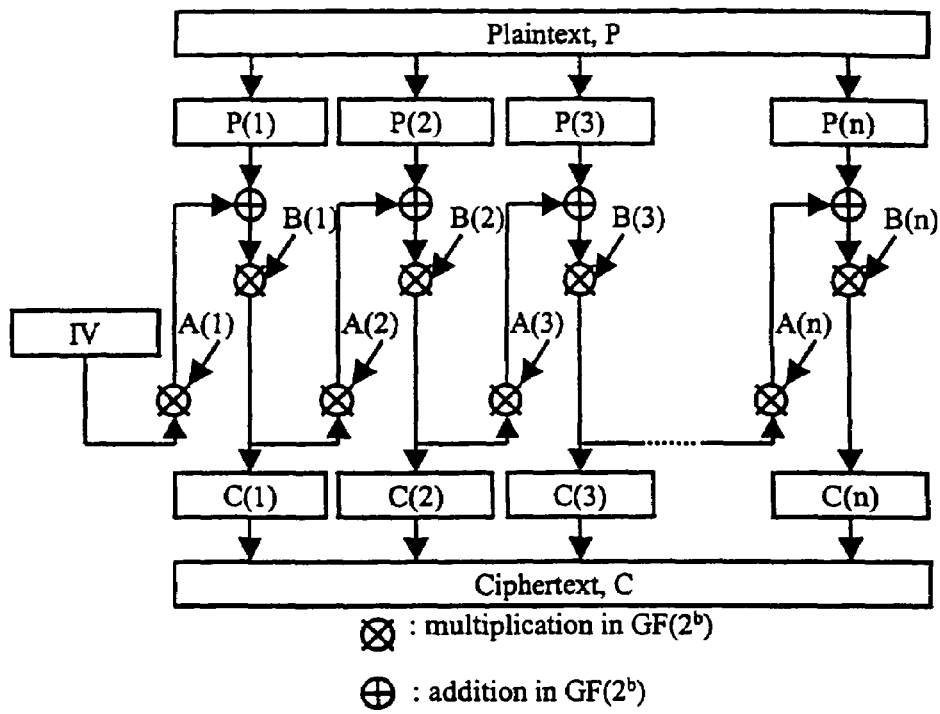
FIGS. 12–19 are schematic block diagrams showing various implementations of the mixing function MX with feedback.

FIG. 12 represents the mixing function:

$$C(i)=MX(P(i), S(i), C(i-1))=((C(i-1)*A(i))^{\wedge}P(i))*B(i)$$

Figure 13:
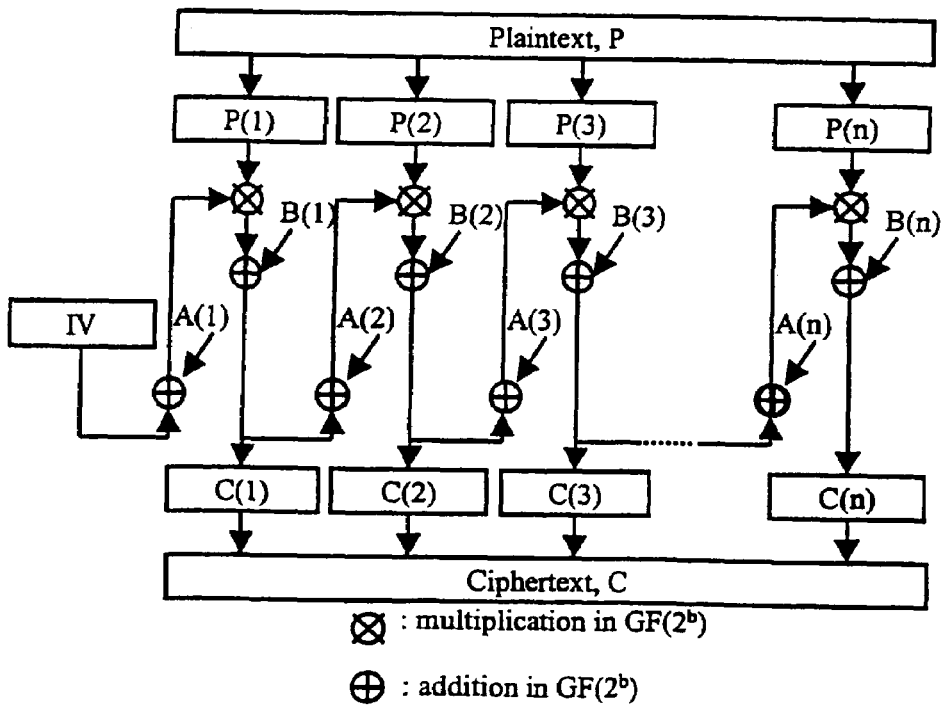

FIG. 13 represents the mixing function:

$$C(i)=MX(P(i), S(i), C(i-1))=((C(i-1)^{\wedge}A(i))*P(i))^{\wedge}B(i)$$

Figure 14:
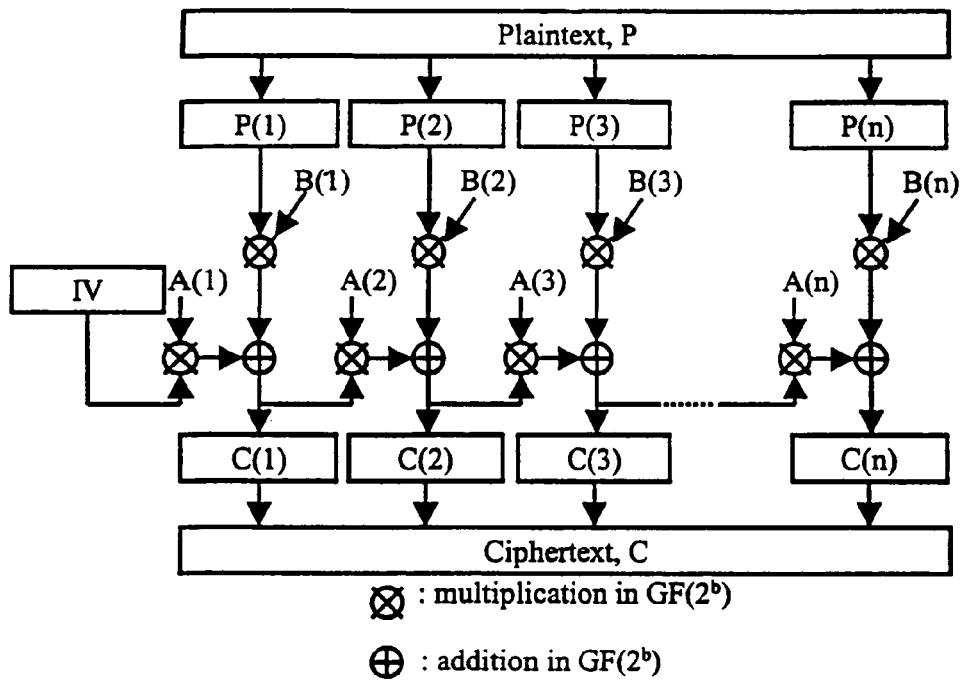

FIG. 14 represents the mixing function:

$$C(i)=MX(P(i), S(i), C(i-1))=((C(i-1)*A(i))^{\wedge}(P(i)*B(i))$$

Figure 15:
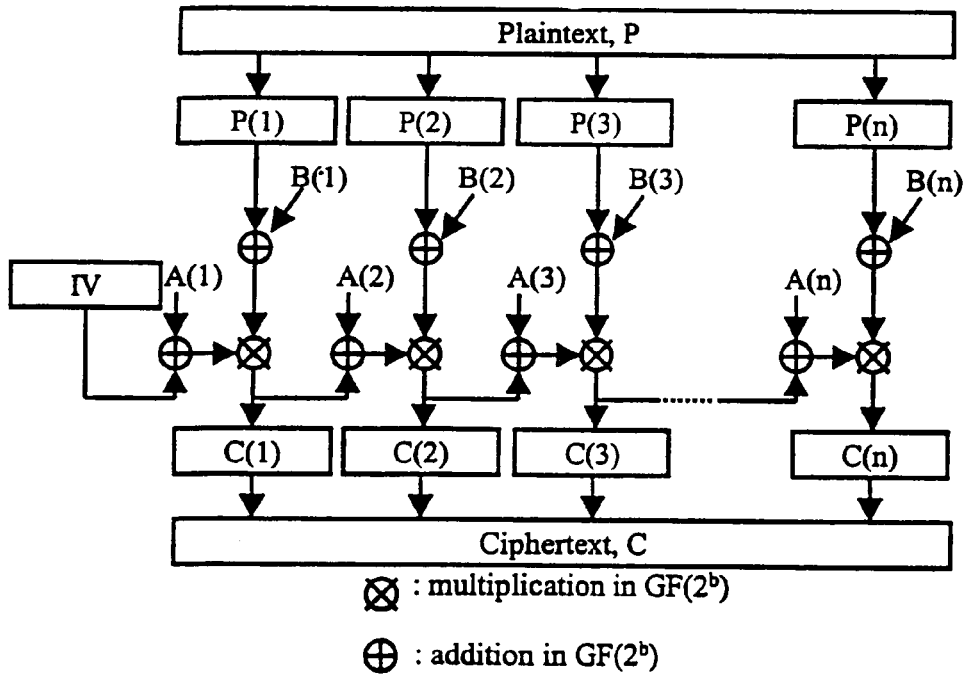

FIG. 15 represents the mixing function:

$$C(i)=MX(P(i), S(i), C(i-1))=(C(i-1)^{\wedge}A(i))*(P(i)^{\wedge}B(i))$$

S(i) can be divided into more than two blocks. For example, referring to FIGS. 16 to 19, a pseudo-random sequence S(i) of length 3b bits, is divided into three blocks A(i), B(i) and D(i), each of length b bits.

Figure 16:
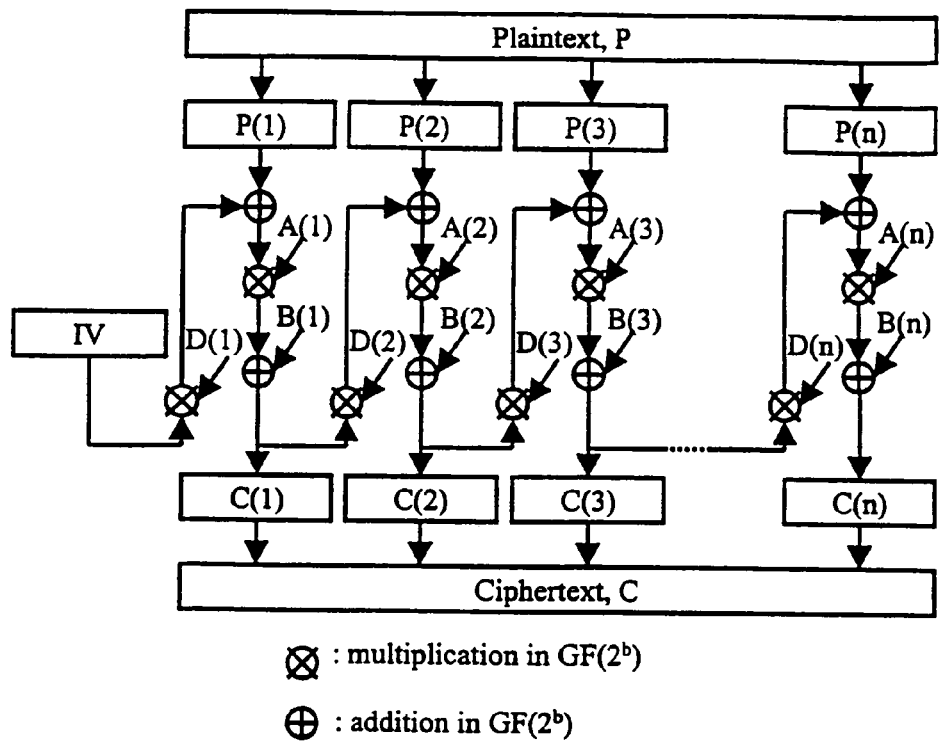

FIG. 16 represents the mixing function:

$$C(i)=MX(P(i), S(i), C(i-1))=(((C(i-1)*D(i))^{\wedge}P(i))*A(i))^{\wedge}B(i)$$

Figure 17:
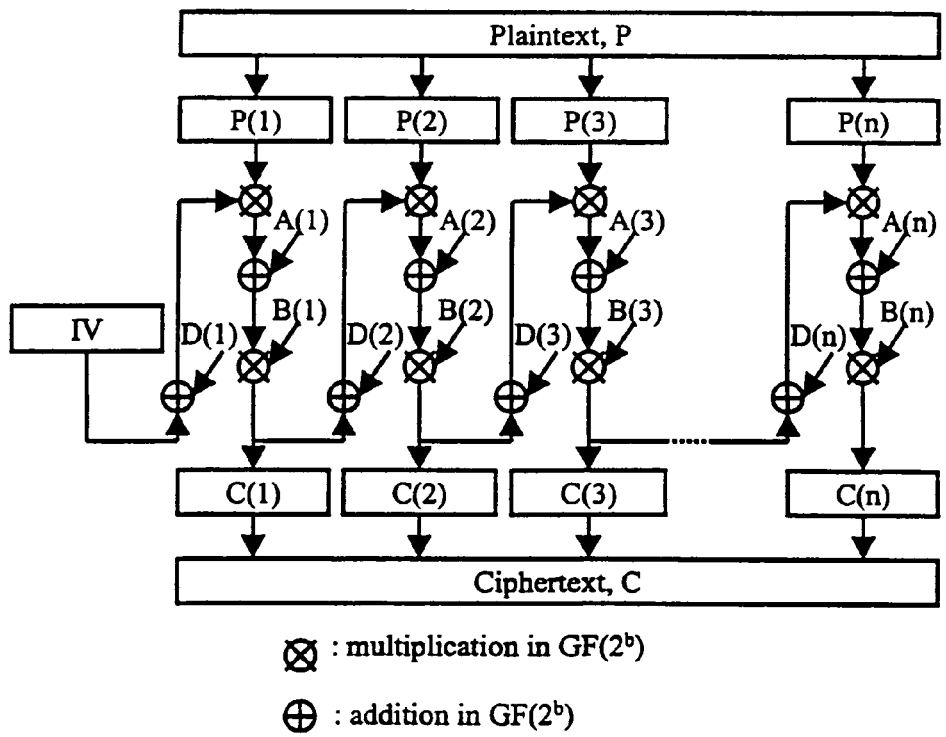

FIG. 17 represents the mixing function:

$$C(i)=MX(P(i), S(i), C(i-1))=(((C(i-1)^{\wedge}D(i))*P(i))^{\wedge}A(i))*B(i)$$

Figure 18:
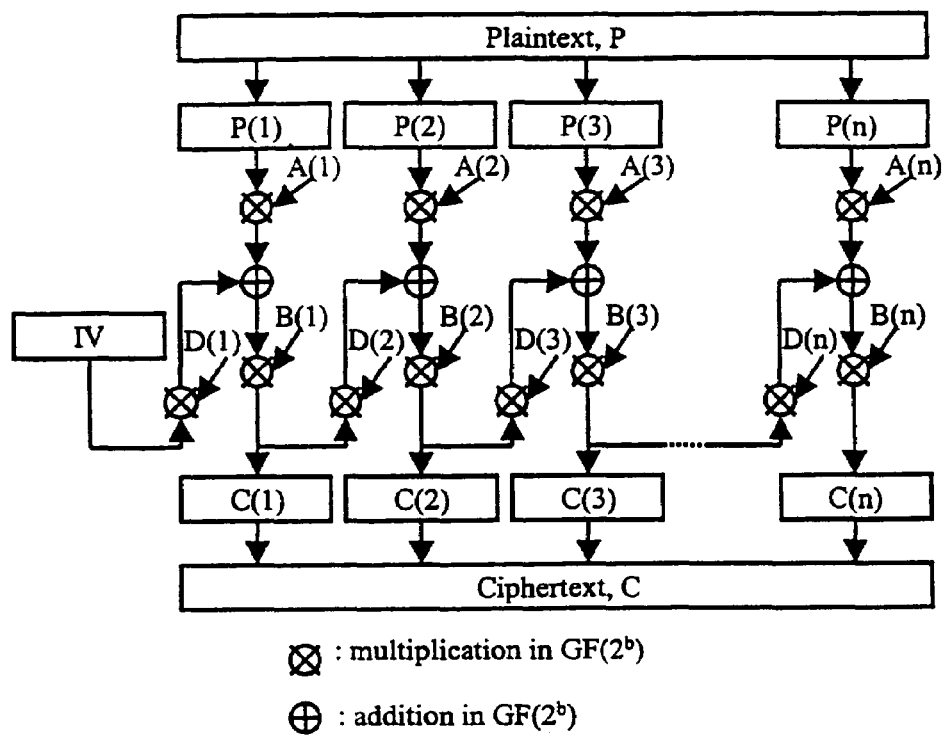

FIG. 18 represents the mixing function:

$$C(i)=MX(P(i), S(i), C(i-1))=((C(i-1)*D(i))^{\wedge}(P(i)*A(i)))*B(i)$$

Figure 19:
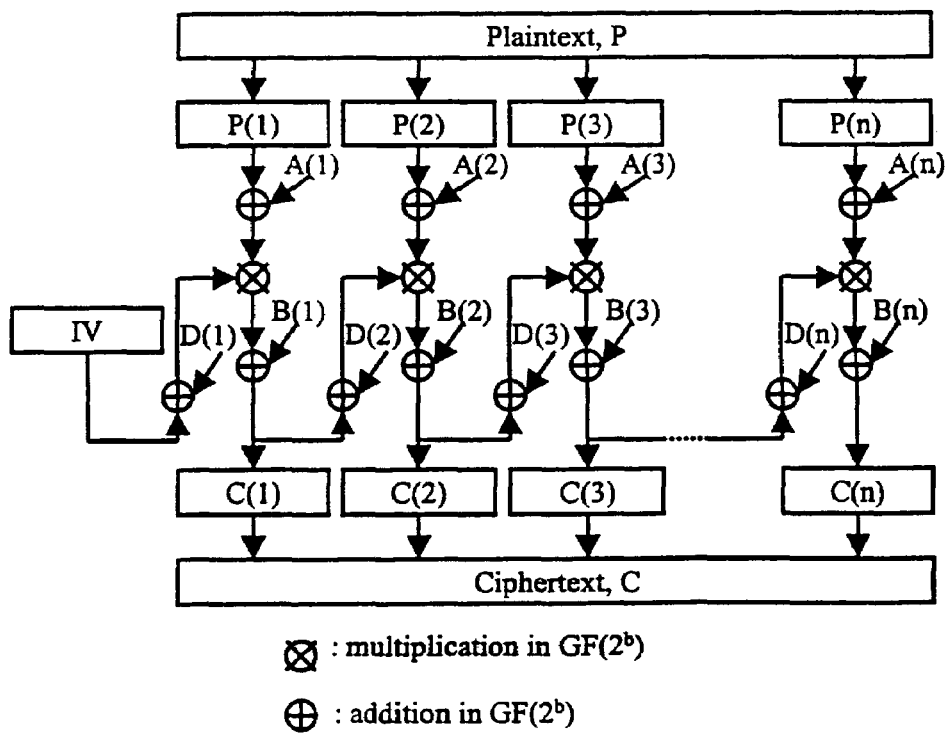

FIG. 19 represents the mixing function:

$$C(i)=MX(P(i), S(i), C(i-1))=((C(i-1)\char`\^ D(i))*(P(i)\char`\^ A(i)))\char`\^ B(i)$$

Figure 20:
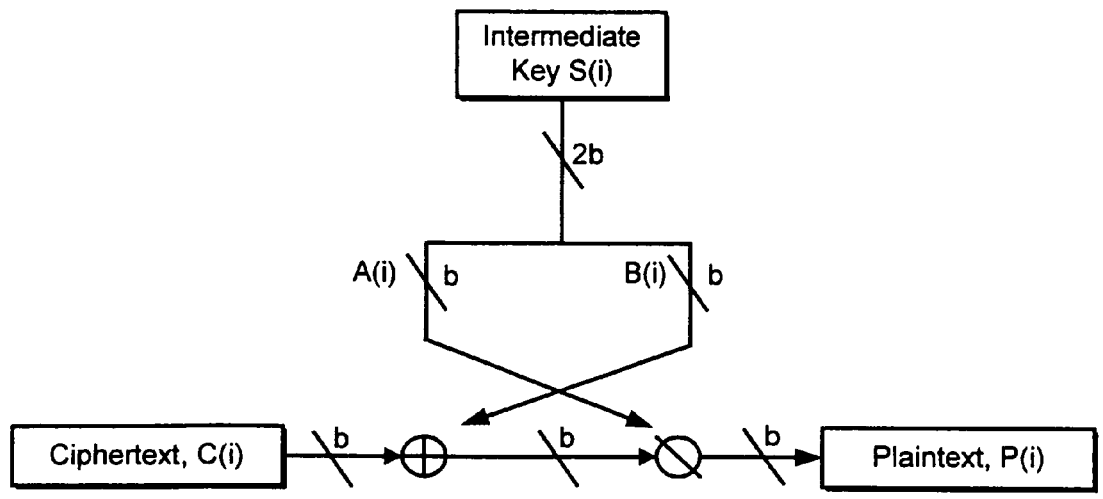
FIG. 20 is a schematic block diagram showing an example of an inverse mixing function $MX^{-1}$ corresponding to the mixing function MX shown in FIG. 10.

Referring to FIG. 20, an inverse function ($MX^{-1}$) of the MX function shown in FIG. 10 comprises two operator functions, each of which operate on separate parts A(i) and B(i) of the pseudo-random input block S(i). For example, B(i) is combined with the b-bit block C(i) by addition in $GF(2^b)$ and the result is combined with A(i) by division in $GF(2^b)$, where division and addition in $GF(2^b)$ refers to computation in a Galois Field as explained in relation to FIG. 10.

Figure 21:
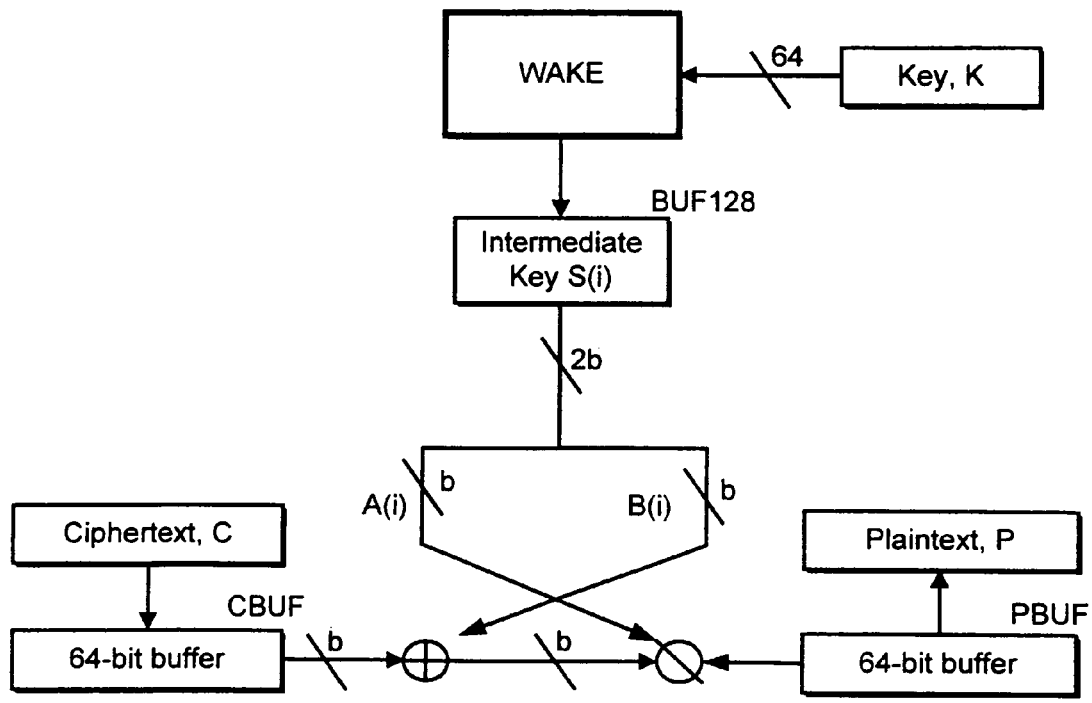
FIG. 21 is a block diagram showing a more detailed implementation of the inverse mixing function $MX^{-1}$ shown in FIG. 20.

Referring to FIG. 21, a more detailed implementation of the decryption function of FIG. 20 is shown. A 64-bit key K is used as an input to the WAKE stream cipher, which produces a stream of 32-bit words. Four such words are stored in a 128-bit buffer BUF128 to provide the keystream block S(i). The 128-bit block S(i) is split into two 64-bit blocks A(i) and B(i). Ciphertext C is stored 64 bits at a time in a 64-bit ciphertext buffer CBUF. The $MX^{-1}$ function relies on division and addition in GF ($2^{64}$) as explained with reference to FIG. 20.

The resulting plaintext block P(i) is stored 64 bits at a time in a 64-bit plaintext buffer PBUF and the whole plaintext is generated by concatenation of the resulting plaintext blocks, i.e. P(1)‖P(2)‖P(3) . . . ‖P(n), where n is the total number of plaintext blocks.

Encryption with Nonce

Figure 22:
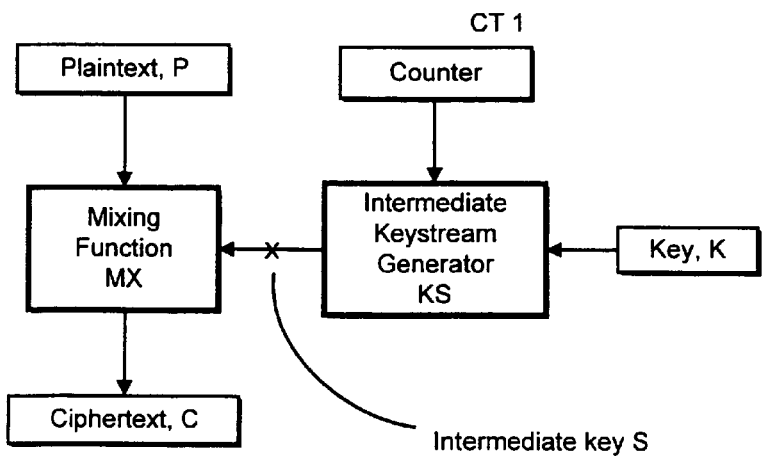
FIG. 22 is a block diagram showing an encryption apparatus comprising a counter as a nonce input.

As mentioned above, if an encryption scheme uses a nonce as an input value, the nonce is designed so as to avoid generation of the same key value. For example, referring to FIG. 22, the encryption apparatus includes a nonce input to the key sequence generator KS, where the nonce values are generated by a counter CT 1 which counts from 1 to n, where n is the number of plaintext blocks to be encrypted. Therefore, the nonce has a unique value for each plaintext block to be encrypted.

Figure 23:
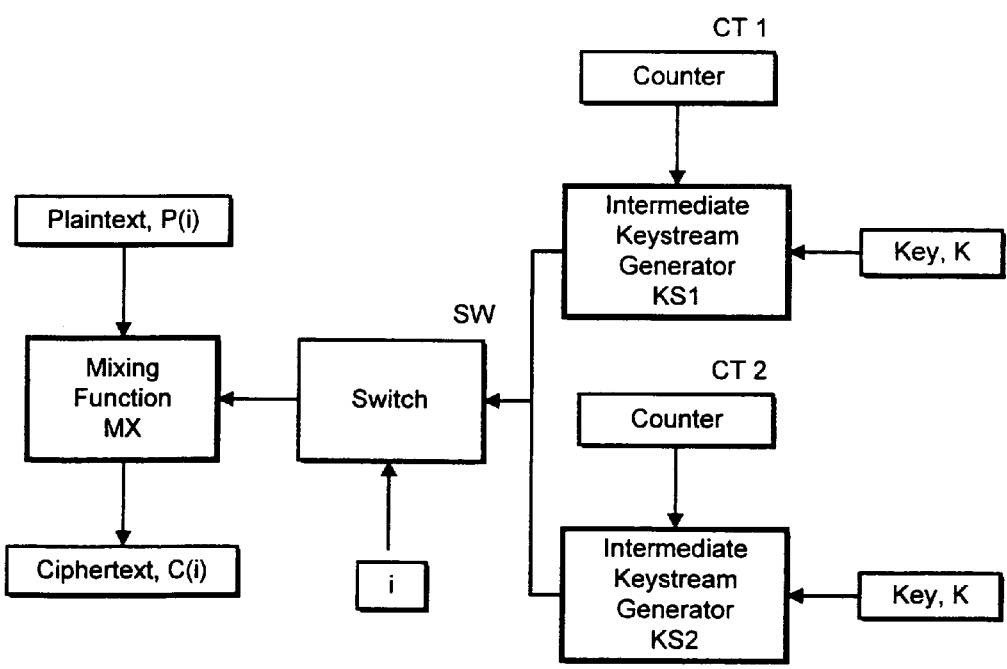
FIG. 23 is a block diagram showing a model for parallel computation.

Advantageously, if the nonce sequence is readily predictable, parallel computation is facilitated. For example, referring to FIG. 23, parallel computation is implemented by two independent keystream generators KS1 and KS2. Each counter CT1, CT2 is synchronised to the block number i but produces a single increment every two blocks, with one counter CT1 causing KS1 to produce the block sequence S(1), S(3), S(5) . . . S(n−1), and the other counter CT2 causing KS2 to produce the block sequence S(2), S(4), S(6), . . . S(n). A switching element SW switches between the outputs of KS1 and KS2 so that each plaintext block P(i) is mixed by the function MX with the correct block S(i) to produce the ciphertext block C(i). The speed of the switching function is greater than that of the intermediate key generating step, so that an overall increase in operating speed results. This scheme can be generalised to realise parallel computation by a factor r, using a plurality of keystream generators, KSi, where i=1, . . . r, each of which generates only S((j−1)×r)+i), where j=1, . . . , n/r, where 'x' represents integer multiplication.

Figure 24:
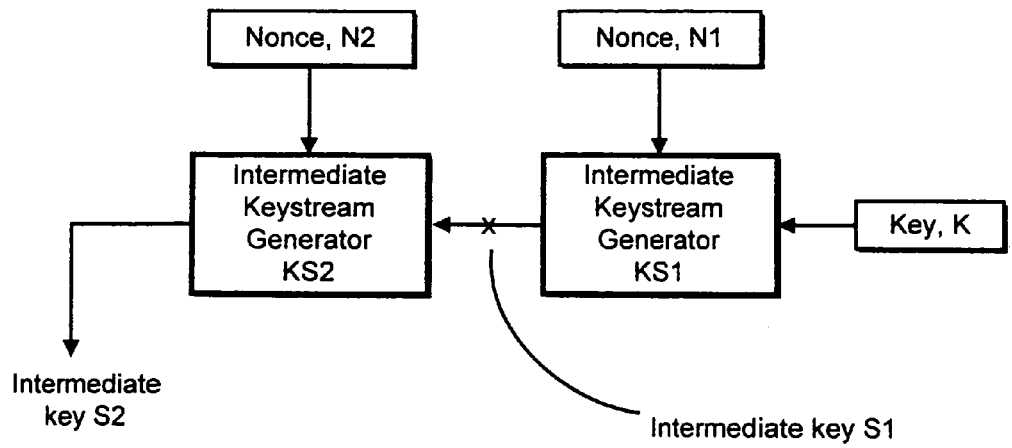
FIG. 24 is a block diagram illustrating an extension of the KS function.
Figure 25:
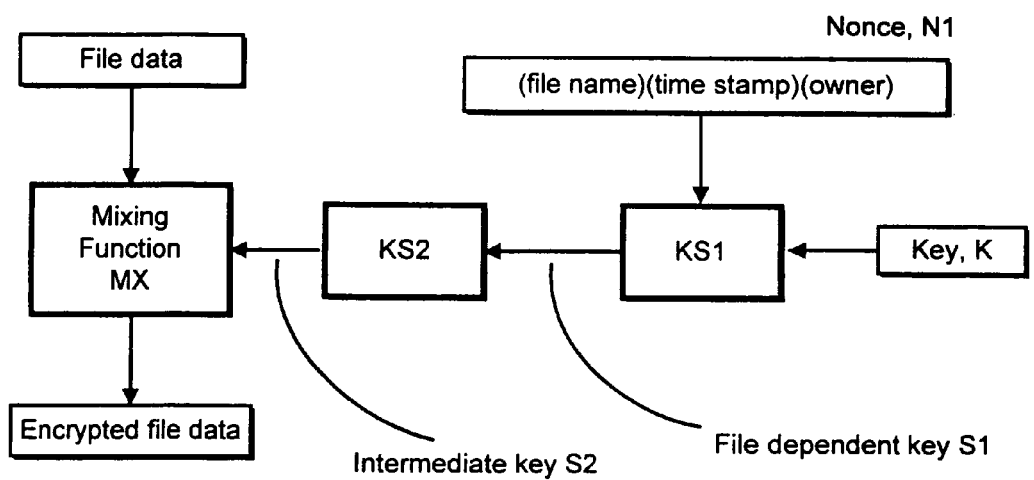
FIG. 25 illustrates an application of the apparatus of FIG. 24 as a disk encryption system.

Referring to FIG. 24, the pseudo-random sequence S1 generated using a nonce input N1 to a keystream generator KS1 can be used as the input to a second keystream generator KS2, which receives a second nonce input N2 to produce a second sequence S2. Therefore, two intermediate keys S1, S2 are produced. The arrangement of FIG. 24 can be used as a disk encryption system, as shown in FIG. 25. KS1 generates a file dependent key S1 out of the secret key K and the nonce input N1, which comprises a concatenation of the file name with a time stamp and the identity of the file owner. KS2 receives the key S1 and generates the intermediate key S2 which is used by the function MX to encrypt the original file data. This provides increased security over a disk encrypted with a single key, since the encryption key S1 differs from file to file, and the master key K is kept secret at the encryption site.

Various examples of the application of the encryption and decryption apparatus and techniques according to the invention will now be described with reference to FIGS. 26 to 33.

Figure 26:
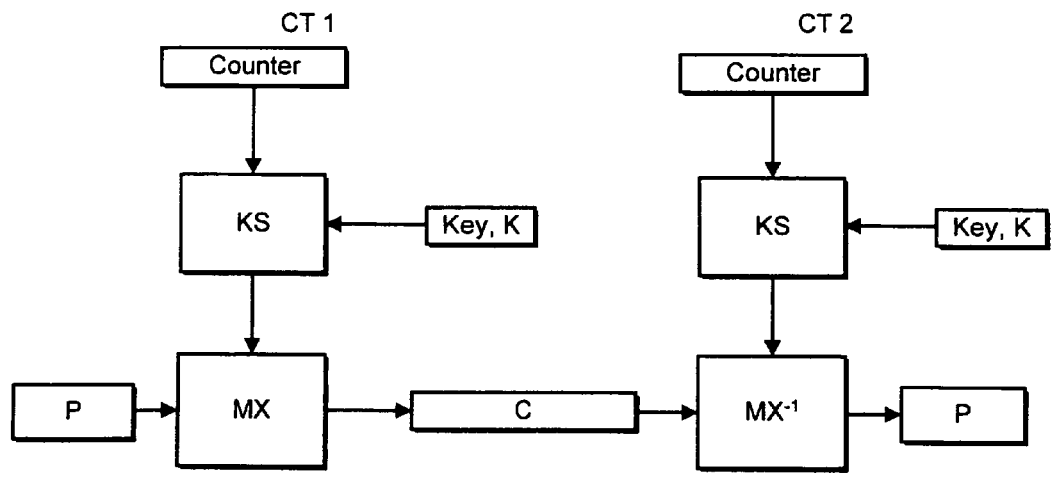
FIG. 26 illustrates an example of encryption with a nonce, applied to a communications system.

Referring to FIG. 26, in a communications system, a receiver and a transmitter share a key and synchronise counters CT1, CT2, so that KS generates the same value at the receiver and at the transmitter. Consequently, each encrypted plaintext block C(i) can be decrypted by operating on it with the inverse mixing function $MX^{-1}$ to recover the original plaintext block P(i).

Figure 27:
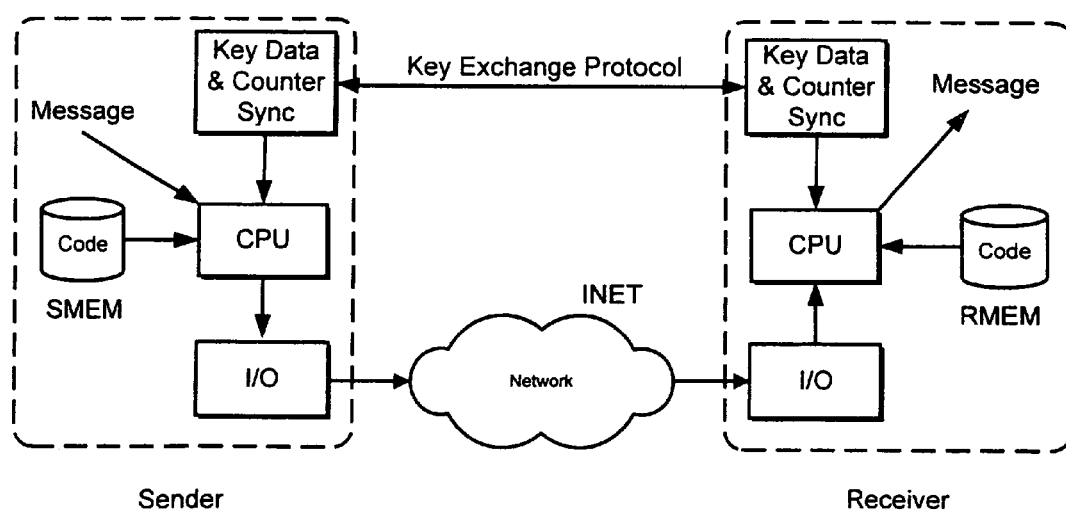
FIG. 27 illustrates a software implementation of the encryption scheme of FIG. 26.

Referring to FIG. 27, the encryption scheme for the communications system of FIG. 26 can be implemented in software. The sender and receiver exchange keys and the synchronising counter value using a known key exchange protocol, for example Otway-Rees, Kerberos or, if public-key cryptography is used, Diffie-Hellman. Reference is further directed to Bruce Schneier, "Applied Cryptography", Second Edition, pp. 59–60 and 513–515. Encryption program code for implementing the KS and MX functions shown in FIG. 26 and previously described is stored in a memory SMEM. A CPU at the Sender side executes the encryption code to encrypt a message. The encrypted message is transferred over the network INET via the sender's I/O device, received by the receiver's I/O device, and decrypted by the receiver CPU running the decryption code, which implements KS and $MX^{-1}$ as previously described, which is stored in memory RMEM, to recover the message. The software implementation is suitable for use in a wide variety of devices including devices such as PCs, smart cards, network routers and in remote controllers for equipment such as car security devices.

Figure 28:
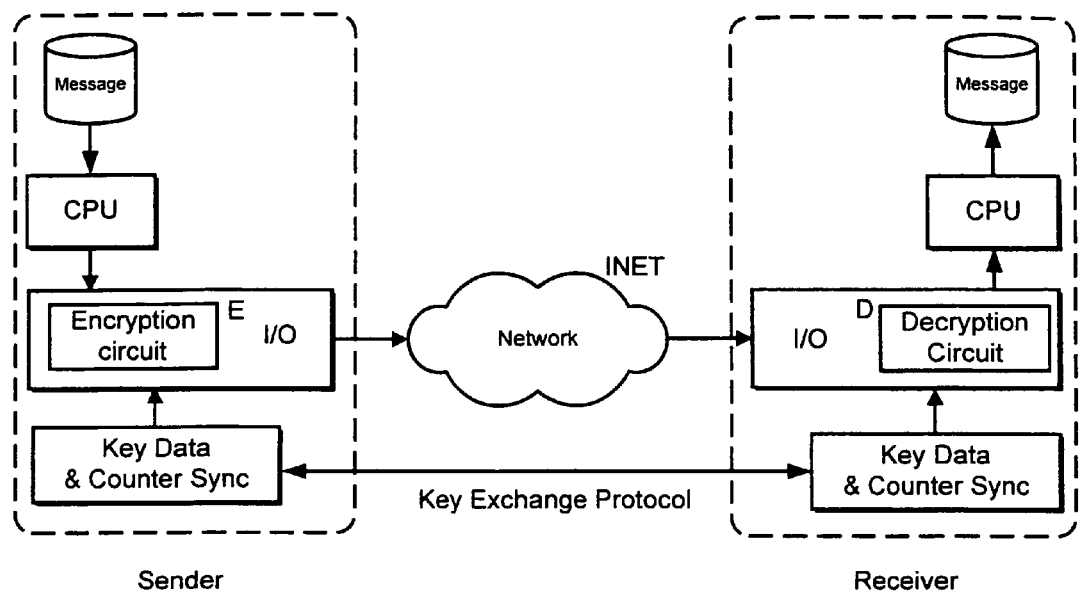
FIG. 28 shows a hardware implementation of the encryption scheme of FIG. 26.

Referring to FIG. 28, encryption and decryption can also be implemented as dedicated hardware circuits, for example embedded in the I/O devices of sender and receiver respectively. The encryption circuit E implements the KS and MX functions, while the decryption circuit D implements the KS and $MX^{-1}$ functions, both as previously described above. The Sender's CPU sends a plaintext message to the sender's I/O device, so that the message is encrypted by the encryption circuit E using a key and counter value which is shared with the receiver prior to the communication using a key exchange protocol. The encrypted message is sent via the network INET and is received by the receiver's I/O device. The embedded decryption circuit D decrypts the message which is then stored in memory by the receiver's CPU. Dedicated hardware encryption/decryption circuits are used in devices such as high-end smart cards and smart card readers, mobile terminals, PCs, TV, DVD players and so on.

Figure 29:
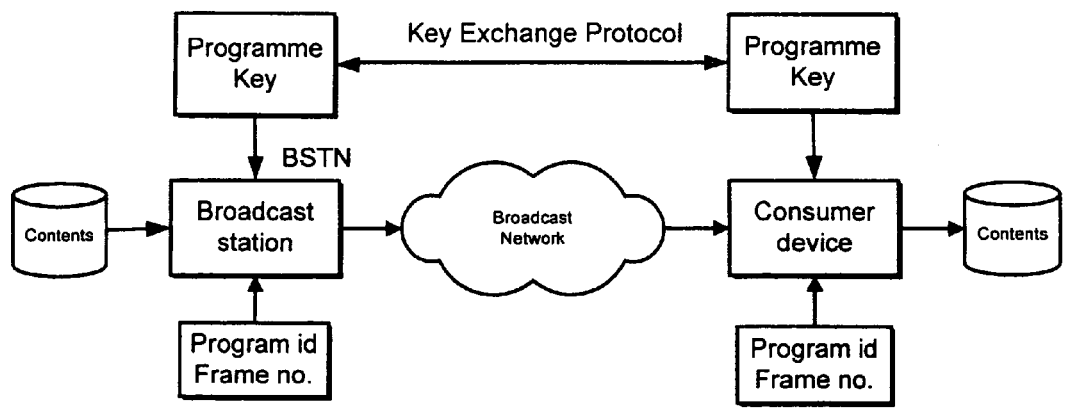
FIG. 29 illustrates an example of an encryption system used in broadcasting.

Referring to FIG. 29, in a broadcasting system, a broadcast station BSTN generates a programme key, and a nonce which comprises a programme identifier and frame number of the contents data where a programme is divided into several frames. The contents data is encrypted using the key and nonce. A key exchange protocol is used to transmit the key to a consumer device, for example a digital TV, which contains the inverse decryption function $MX^{-1}$. Knowing the key and the programme identifier and frame numbers of the programme which the consumer wishes to view, the consumer device can decrypt the programme. The key server at the broadcast station can generate intermediate keys based on the frame information, so that intermediate frame keys are sent to the consumer device during a programme. To receive the whole programme, a third party would then have to cryptanalyse all of the frame keys.

Figure 30:
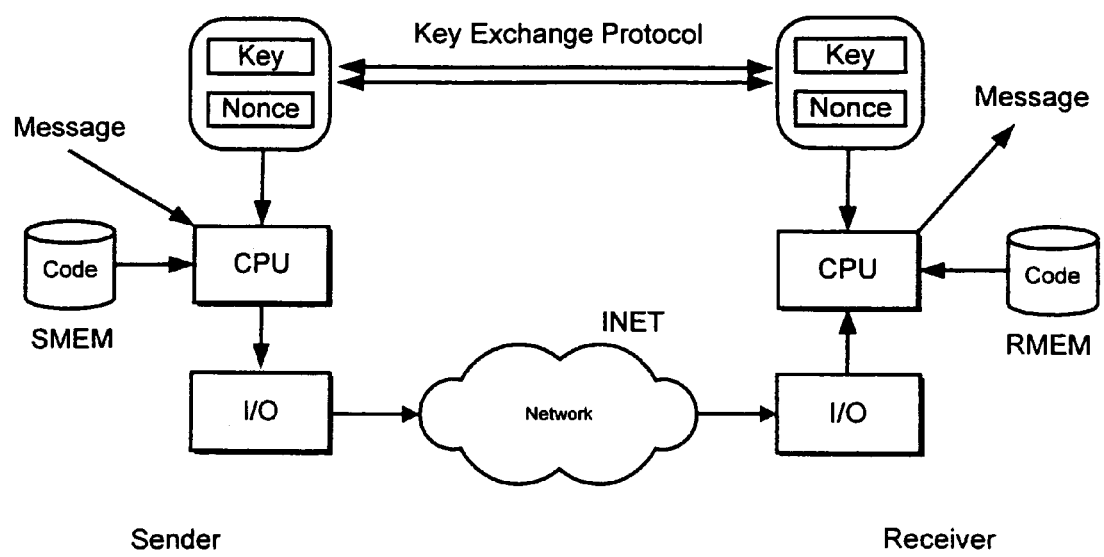
FIG. 30 is a schematic block diagram illustrating a method of enhancing key confidentiality by limiting key exchange using nonces.

Referring to FIG. 30, a nonce can be used to enhance key confidentiality. The first key exchange between two devices must exchange both the key and the nonce. However, when the key value is to be updated, for example, for the next frame of data, only the nonce need be exchanged. The secret key need therefore only be exchanged once, whereas the nonce can be repeatedly exchanged, without compromising the security of the system, if it becomes known. If the system has a way of nonce-updating, for example a counter to track frame numbers, then the first nonce need only be used for frame synchronisation and further nonces need not be sent.

Figure 31:
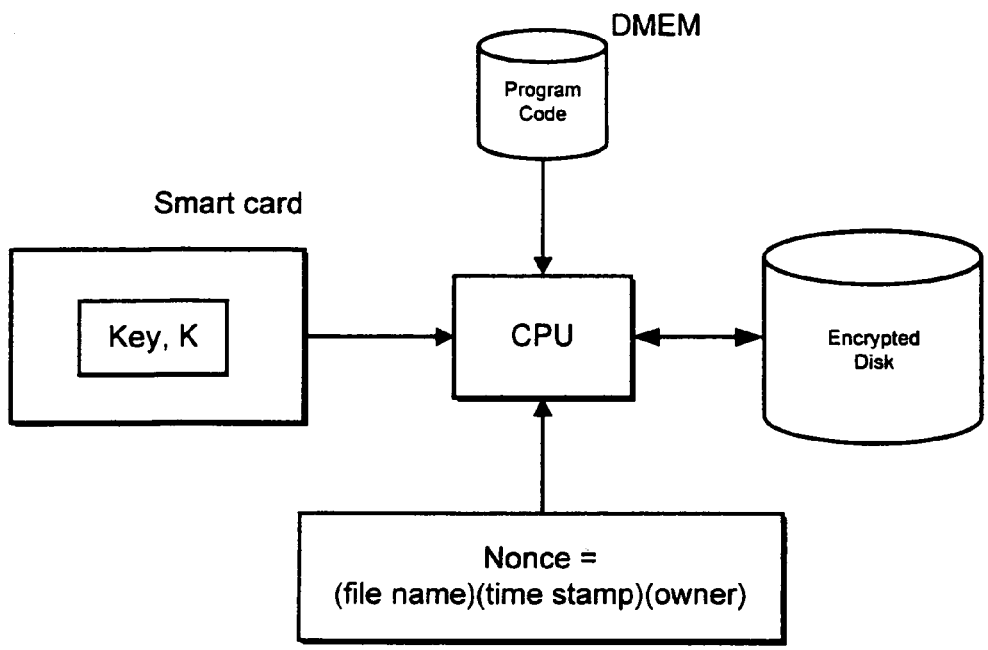
FIG. 31 illustrates an example of a disk encryption system.

Referring to FIG. 31, in an implementation of a disk encryption system as described with reference to FIG. 25, files are encrypted under different keys, where each nonce comprises a concatenation of a file name with a time stamp and an owner identity. The CPU implements the encryption algorithm stored in memory DMEM, and described in relation to FIG. 25. The secret key is kept on a smart card by the operator of the encryption system.

Figure 32:
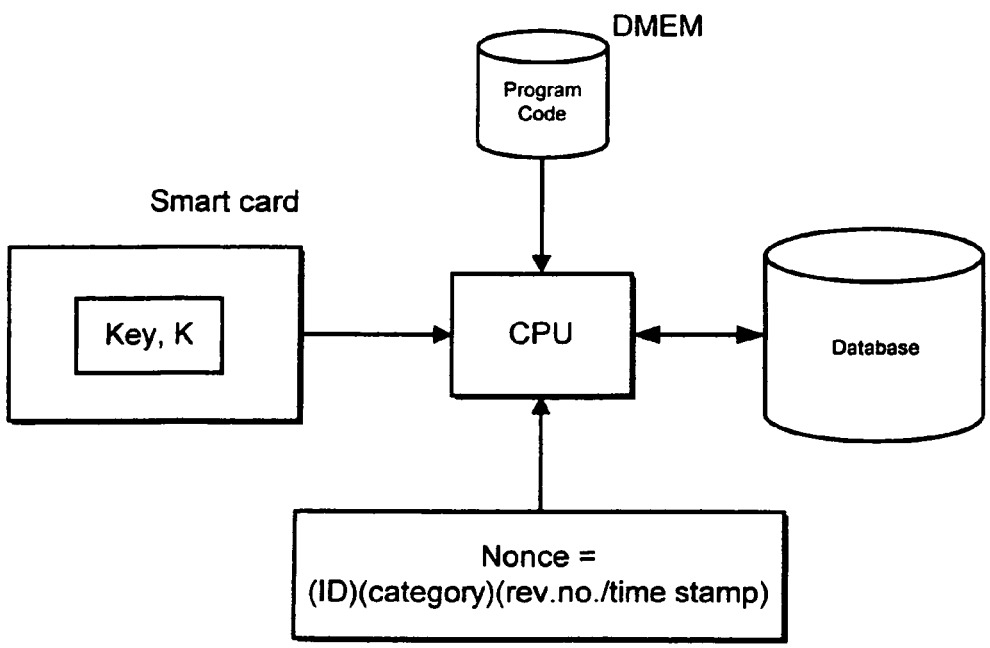
FIG. 32 illustrates an example of a database encryption system.

Referring to FIG. 32, which illustrates a further application of the encryption algorithm described with reference to FIG. 25 for a database encryption system, the nonce comprises a concatenation of ID, category and revision number or time stamp.

Figure 33:
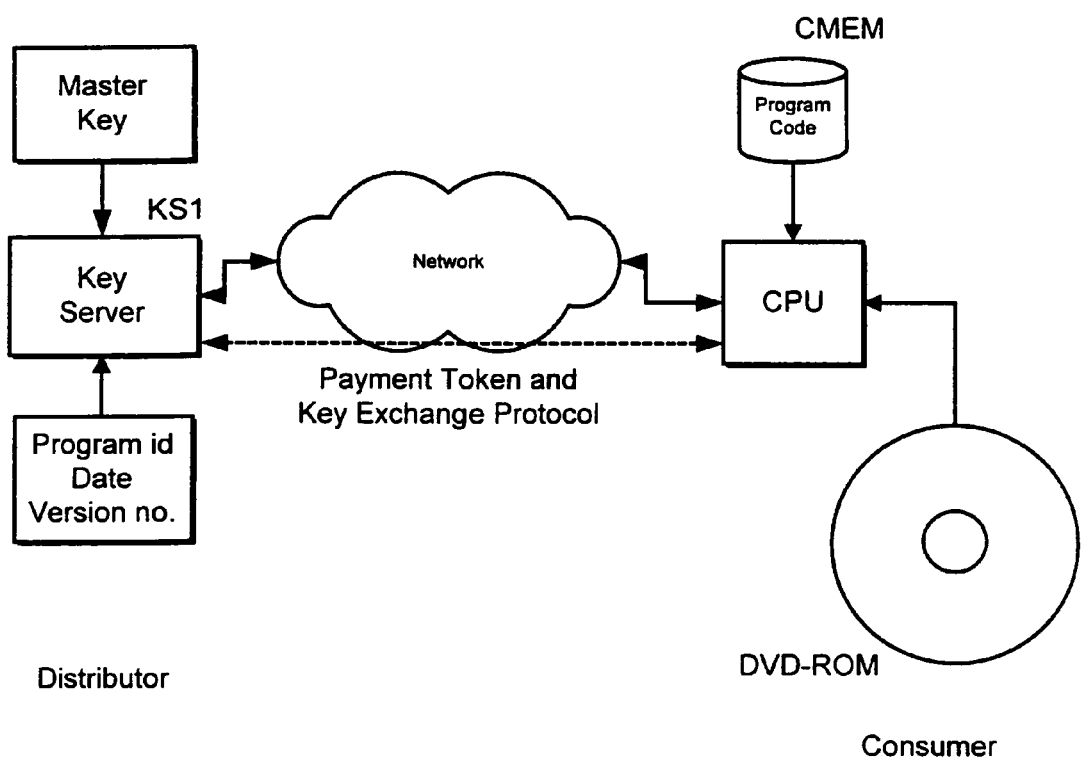
FIG. 33 shows an example of a multimedia distribution system.
Figure 34:
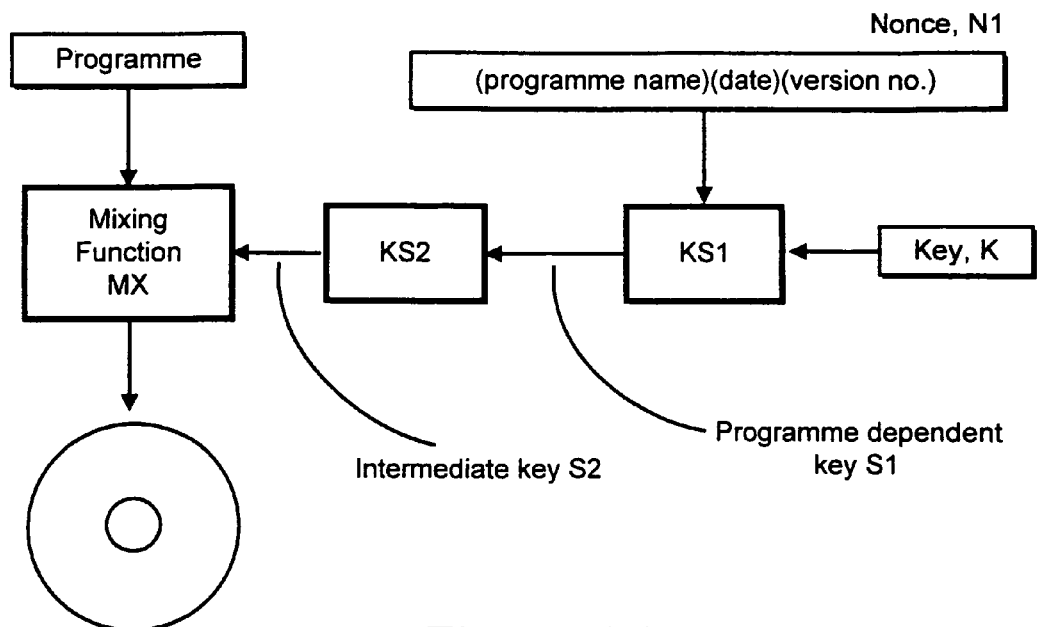
FIG. 34 is a schematic diagram of the encryption software for the multimedia system of FIG. 33.
Figure 35:
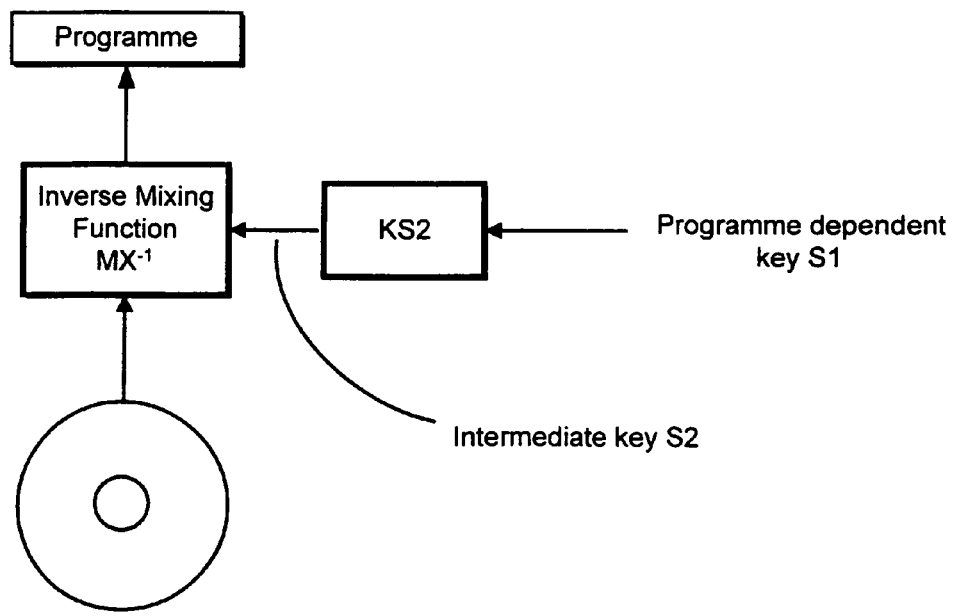
FIG. 35 is a schematic diagram of the decryption software for a consumer device to be used with the multimedia distribution system of FIG. 33.

FIG. 33 illustrates a further application of the encryption algorithm described with reference to FIG. 25 for use in a multimedia distribution system. Content on a CD- or DVD-ROM is encrypted using a secret key K and a nonce N1 which comprises, for example, a concatenation of the program name with the date and a version number. For example, referring to FIG. 34, a number of programmes are encrypted onto DVD-ROM, each programme being encrypted under its own key S1 using the master key K and the nonce N1, which is unique to each film on the DVD-ROM. Copies of the DVD-ROMs are distributed to consumers free of charge. When a consumer wishes to play one of the films on the encrypted disk, the consumer contacts key server KS1 with his requirements and makes the appropriate payment, for example by credit card over the Internet. The key server KS1 calculates the key S1 to be sent to the consumer from the master key K and the programme titles and other data, stored at the key server KS1, which make up nonce N1. A key exchange protocol is then initiated and the consumer device receives the appropriate intermediate key S1. Referring to FIG. 35, the consumer device uses the key S1 as the input to a keystream generator KS2 to generate the correct intermediate key S2. Therefore, referring again to FIG. 33, the required film can be decrypted by the consumer's CPU running the decryption program code stored in memory CMEM, which implements the functionality shown in FIG. 35.

The invention claimed is:

1. Encryption apparatus for performing symmetric encryption, comprising:
   means (KS) for generating a keystream block (S(i)) in response to an encryption key (K), the keystream block comprising a plurality of bits (s) of a pseudo-random number sequence; and
   means (MX) for combining the keystream block (i) with a plaintext block (P(i)) comprising a plurality of bits (b) to produce a ciphertext block (C(i));
   wherein the number of bits (s) in the keystream block exceeds the number of bits (b) in the plaintext block.

2. Apparatus according to claim 1, wherein the generating means comprises means for selecting successive keystream blocks (S(i)) from said pseudo-random number sequence, each to be combined with a respective plaintext block (P(i)) from plaintext data (P) to be encrypted.

3. Apparatus according to claim 2, wherein the combining means is configured to use each of the successive keystream blocks once only during the encryption of plaintext data under a given key.

4. Apparatus according to claim 2, wherein the selecting means is configured to select non-overlapping bit sequences from said pseudo-random number sequence to form each of the keystream blocks.

5. Apparatus according to claim 1, wherein the or each keystream block S(i) comprises at least twice as many bits (2b, 3b) as the or each plaintext block P(i).

6. Apparatus according to claim 1, further comprising means for splitting the or each keystream block (S(i)) into sub-blocks (A(i), B(i), D(i)).

7. Apparatus according to claim 6, wherein the sub-blocks have the same number of bits as the plaintext block (P(i)) to be encrypted.

8. Apparatus according to claim 1, wherein the combining means comprises first means for combining a first portion (A(i)) of the keystream block (S(i)) with the plaintext block (P(i)) to produce a first combination, and second means for combining the result of said first combination with a second portion (B(i)) of the keystream block S(i) to produce the ciphertext block (C(i)).

9. Apparatus according to claim 8, wherein said first and second combining means each comprise different mathematical operations.

10. Apparatus according to claim 8, wherein one of the first and second combining means comprises means for multiplying in $GF(2^b)$.

11. Apparatus according to claim 8, wherein one of the first and second combining means comprises means for adding in $GF(2^b)$.

12. Apparatus according to claim 8, further comprising a third combining means for combining a third portion (D(i)) of the keystream block S(i) with a ciphertext block (C(i−1)) to provide a feedback input.

13. Apparatus according to claim 1, wherein said generating means further comprises a nonce input.

14. Apparatus according to claim 13, comprising a counter (CT1, CT2) for generating the nonce input.

15. Apparatus according to claim 13, wherein said generating means comprises a hash function generator.

16. Apparatus according to claim 1, comprising a plurality of keystream generators (KSi) for generating intermediate keys and means (SW) for switching between said keystream generators in dependence on the plaintext block (P(i)) to be encrypted.

17. Apparatus according to claim 1, wherein the keystream generator comprises a first keystream generator for generating a first intermediate key (K 1), further comprising a second keystream generator for generating a second intermediate key (K2) in response to the first intermediate key.

18. Apparatus according to claim 17, wherein the first intermediate key comprises an encryption key for an individual element selected from a plurality of elements to be encrypted.

19. Encryption apparatus comprising:

a keystream generator (KS) for generating a pseudo-random number sequence in response to an encryption key (K); and processing circuitry (MX) configured to combine a keystream block (S(i)) comprising a bit pattern selected from the pseudo-random number sequence with a plaintext block (P(i)) comprising a bit sequence, said keystream block bit pattern comprising a greater number of bits than the plaintext block bit sequence.

20. Decryption apparatus for performing symmetric decryption, comprising:

means (KS) for generating a keystream block (S(i)) in response to a decryption key (K), the keystream block comprising a plurality of bits (s) of a pseudo-random number sequence; and means ($MX^{-1}$) for combining the keystream block (S(i)) with a ciphertext block (C(i)) comprising a plurality of bits (b) to recover a plaintext block (P(i));

wherein the number of bits (s) in the keystream block exceeds the number of bits (b) in the ciphertext block.

21. Apparatus according to claim 20, comprising generating means as claimed in claim 1.

22. Apparatus according to claim 20, wherein the combining means is the inverse of the combining means claimed in claim 1.

23. Decryption apparatus configured to decrypt ciphertext encrypted by the apparatus of claim 1.

24. A method of performing symmetric encryption comprising:

generating a keystream block (S(i)) in response to an encryption key (K), the keystream block comprising a plurality of bits (s) of a pseudo-random number sequence; and combining the keystream block (S(i)) with a plaintext block (P(i)) comprising a plurality of bits (b) to produce a ciphertext block (C(i));

wherein the number of bits (s) in the keystream block exceeds the number of bits (b) in the plaintext block.

25. A method according to claim 24, comprising the step of selecting successive key sequence blocks from the pseudo-random number sequence, each to be combined with a respective plaintext block from a plaintext message (P).

26. A method according to claim 25, comprising using each of the successive keystream blocks once only during the encryption of a given plaintext message to encrypt a single plaintext block P(i).

27. A method of decrypting a symmetrically encrypted ciphertext message (C) comprising:

generating a keystream block (S(i)) in response to a decryption key (K), the keystream block comprising a plurality of bits (s) of a pseudo-random number sequence; and combining the keystream block (S(i)) with a ciphertext block (C(i)) comprising a plurality of bits (b) to produce a plaintext block (P(i));

wherein the number of bits (s) in the keystream block exceeds the number of bits (b) in the ciphertext block.

28. A computer program stored on a computer readable storage medium for performing symmetric encryption comprising means for generating a keystream block (S(i)) in response to an encryption key (K), the keystream block comprising a plurality of bits (s) of a pseudo-random number sequence; and means for combining the keystream block (S(i)) with a plaintext block (P(i)) comprising a plurality of bits (b) to produce a ciphertext block (C(i));

wherein the number of bits (s) in the keystream block exceeds the number of bits (b) in the plaintext block.

29. A computer program stored on a computer readable storage medium for decrypting a symmetrically encrypted ciphertext message (C) comprising:

means for generating a keystream block (S(i)) in response to a decryption key (K), the keystream block comprising a plurality of bits (s) of a pseudo-random number sequence; and means for combining the keystream block (S(i)) with a ciphertext block (C(i)) comprising a plurality of bits (b) to produce a plaintext block (P(i));

wherein the number of bits (s) in the keystream block exceeds the number of bits (b) in the ciphertext block.

* * * * *